United States Patent
Yamagata et al.

(10) Patent No.: US 10,675,673 B2
(45) Date of Patent: Jun. 9, 2020

(54) METHOD OF MANUFACTURING MECHANICAL PART AND MECHANICAL PART

(71) Applicant: NIPPON STEEL & SUMITOMO METAL CORPORATION, Tokyo (JP)

(72) Inventors: Mitsuharu Yamagata, Chiba (JP); Shuji Yamamoto, Kitakyushu (JP); Yasuhiro Wada, Kitakyushu (JP)

(73) Assignee: NIPPON STEEL CORPORATION, Tokyo (JP)

(*) Notice: Subject to any disclaimer, the term of this patent is extended or adjusted under 35 U.S.C. 154(b) by 167 days.

(21) Appl. No.: 15/535,301

(22) PCT Filed: Jan. 7, 2016

(86) PCT No.: PCT/JP2016/050320
§ 371 (c)(1),
(2) Date: Jun. 12, 2017

(87) PCT Pub. No.: WO2016/117364
PCT Pub. Date: Jul. 28, 2016

(65) Prior Publication Data
US 2017/0348763 A1    Dec. 7, 2017

(30) Foreign Application Priority Data

Jan. 19, 2015 (JP) .................................. 2015-007912
Jun. 19, 2015 (JP) .................................. 2015-124050

(51) Int. Cl.
*B21K 1/30*       (2006.01)
*B21D 53/28*      (2006.01)
(Continued)

(52) U.S. Cl.
CPC ................ *B21K 1/30* (2013.01); *B21D 22/30* (2013.01); *B21D 53/28* (2013.01); *B21J 5/12* (2013.01);
(Continued)

(58) Field of Classification Search
CPC .......... B21D 22/30; B21D 53/28; B21D 5/00; B21D 5/01; B21D 5/16; B21D 26/029;
(Continued)

(56) References Cited

U.S. PATENT DOCUMENTS 5,809,649 A     9/1998   Köstermeier

FOREIGN PATENT DOCUMENTS

CN      101293262 A     10/2008
CN      102189382 A     9/2011
(Continued)

OTHER PUBLICATIONS

Machine Translation for Maeda, JPH 0788582 (Year: 1995).*
(Continued)

*Primary Examiner* — David P Bryant
*Assistant Examiner* — Christine Bersabal
(74) *Attorney, Agent, or Firm* — Birch, Stewart, Kolasch & Birch, LLP

(57) ABSTRACT

A method of manufacturing a mechanical part of the present invention includes a first process of forming, by performing a folding processing to an end portion of the material, a portion to be processed having a structure, in which a plurality of layers respectively having a thickness corresponding to a plate thickness of a material overlap each other, in the material such that a plate thickness direction of the layer is orthogonal to a plate thickness direction of the material; and a second process of changing, by performing a forging processing to the portion to be processed, a shape of the portion to be processed to a target shape while
(Continued)

press-welding the layers of the portion to be processed to each other by plastic deformation.

6 Claims, 17 Drawing Sheets

(51) Int. Cl.
| | |
|---|---|
| *B21J 5/12* | (2006.01) |
| *F16H 55/17* | (2006.01) |
| *B21D 22/30* | (2006.01) |
| *B23K 20/00* | (2006.01) |
| *B23K 20/02* | (2006.01) |
| *B23P 15/14* | (2006.01) |
| *B23K 101/00* | (2006.01) |
| *F16H 41/24* | (2006.01) |

(52) U.S. Cl.
CPC ............ *B23K 20/002* (2013.01); *B23K 20/02* (2013.01); *B23P 15/14* (2013.01); *F16H 55/17* (2013.01); *B23K 2101/008* (2018.08); *F16H 41/24* (2013.01); *F16H 2055/176* (2013.01)

(58) Field of Classification Search
CPC ........ B21D 37/10; B21D 37/02; B21D 37/12; B21D 13/10; B21J 5/12; B21K 1/30; B23K 20/02; B23K 20/002; B23K 2101/008; B23P 15/14; F16H 55/17; F16H 2055/176; F16H 41/24
See application file for complete search history.

(56) References Cited

FOREIGN PATENT DOCUMENTS

| | | | |
|---|---|---|---|
| CN | 103272842 A | 9/2013 | |
| CN | 103501934 A | 1/2014 | |
| DE | 4205711 A1 | 8/1993 | |
| DE | 19605645 A1 | 8/1996 | |
| EP | 0379364 A2 | 7/1990 | |
| JP | 58-181451 A | 10/1983 | |
| JP | 63-286232 A | 11/1988 | |
| JP | 2-197341 A | 8/1990 | |
| JP | 4-9243 A | 1/1992 | |
| JP | 7-88582 A | 4/1995 | |
| JP | H0788582 B2 * | 9/1995 | ........... C23C 16/403 |
| JP | 7-256377 A | 10/1995 | |
| JP | 9-222158 A | 8/1997 | |
| JP | 11-739 A | 1/1999 | |
| RU | 2195380 C2 | 12/2002 | |
| SU | 218798 A1 | 5/1968 | |

OTHER PUBLICATIONS

Machine Translation for JPH 07256377 (Year: 1995).*
International Search Report for PCT/JP2016/050320 (PCT/ISA/210) dated Mar. 15, 2016.
Written Opinion of the International Searching Authority for PCT/JP2016/050320 (PCT/ISA/237) dated Mar. 15, 2016.
Japanese Notice of Allowance dated Feb. 5, 2019, for Japanese counterpart Application No. 2016-570560, with an English translation.
Russian Office Action and Search Report for corresponding Russian Application No. 2017124597, dated Jun. 28, 2018, with English translation.
Chinese Office Action dated Apr. 27, 2018, issued in Chinese Application No. 201680005550.X.
Extended European Search Report, dated Sep. 17, 2018, for corresponding European Application No. 16739971.6.
Chinese Office Action and Search Report, dated Feb. 22, 2019, for corresponding Chinese Application No. 201680005550.X, with an English translation of the Search Report.

* cited by examiner (a)

(b)

(b) SECTIONAL PERSPECTIVE VIEW (a) PLANAR SECTIONAL VIEW (a)

(b)

(c)

(a)

(b)

(c)

(a)

(b)

(c)

METHOD OF MANUFACTURING MECHANICAL PART AND MECHANICAL PART

TECHNICAL FIELD OF THE INVENTION

The present invention relates to a method of manufacturing a mechanical part and a mechanical part.

Priority is claimed on Japanese Patent Application No. 2015-7912, filed on Jan. 19, 2015 and Japanese Patent Application No. 2015-124050, filed on Jun. 19, 2015, the contents of which are incorporated herein by reference.

RELATED ART

In a metal mechanical part, for example, in a drive plate or a ring gear which is a component of a vehicular automatic transmission, a plate thickness of the ring gear is thicker than a plate thickness of the drive plate in order to secure tooth strength of the ring gear. Accordingly, in general, after the drive plate and the ring gear are separately manufactured, the ring gear is welded to the drive plate to manufacture a single toothed part having both structures. Moreover, as described in Patent Documents 1 and 2 below, a method which manufactures a single toothed part having both structures of the drive plate and the ring gear from a single material is known. In this method, after an annular wall portion is formed along an outer circumference of a single material (for example, a circular metal plate) by drawing the material, a toothed portion (a portion corresponding to the ring gear) is formed in the circumferential direction of the wall portion while the wall portion is thickened by forging the wall portion using a toothed die.

PRIOR ART DOCUMENT

Patent Document

[Patent Document 1] Japanese Unexamined Patent Application, First Publication No. H7-256377
[Patent Document 2] Japanese Unexamined Patent Application, First Publication No. H9-222158

DISCLOSURE OF THE INVENTION

Problems to be Solved by the Invention

In the method which manufactures the single toothed part by welding the drive plate and the ring gear, there is a problem that a manufacturing cost increases since the number of manufacturing steps increases, and there is a problem that it is difficult to secure assembling accuracy at the time of the welding. As described in Patent Documents 1 and 2, in the method of manufacturing the toothed part having both structures of the drive plate and the ring gear from the single material by forging, since the thickening amount (thickness) of the toothed portion (ring gear portion) is limited by the plate thickness of the material, there is a limitation to increase the thickness of the toothed portion. In addition, in order to secure strength of the toothed portion, it is necessary to increase a thickening ratio of the toothed portion. However, if the thickening ratio increases, a folding failure is likely to occur in a root of the toothed portion.

For example, in the toothed part having both structures of the drive plate and the ring gear, a target thickness of the toothed portion (ring gear portion) and target thicknesses of other disk-shaped parts (drive plate portion) are greatly different from each other. Specifically, the thickness of the drive plate portion may be the same as the plate thickness of the material. However, the thickness of the toothed portion is required to be several times the plate thickness of the material so as to secure the strength. In addition, the thickness of the toothed portion indicates a length of the toothed portion in a radial direction (a direction orthogonal to the plate thickness direction of the material) of the toothed part.

However, as described above, in the case where the toothed part having both structures of the drive plate and the ring gear is manufactured by forging the single material, since the thickness of the toothed portion is limited by the plate thickness of the material (that is, there is a limitation in the thickening ratio), it is difficult to set the thickness of the toothed portion to the target thickness (several times the plate thickness of the material). Accordingly, in the related art, it is required to develop a technology which can manufacture a mechanical part which includes portions each having significantly different target thickness, by forging a single material.

Particularly, in recent years, as a method of manufacturing a mechanical part, which requires high dimension accuracy and high strength such as a toothed part for an automatic transmission, from a single material, cold forging has attracted attention. Compared to hot forging, the cold forging has advantages such as obtaining a mechanical part having high accuracy and high strength, decreasing a manufacturing cost, increasing yield, or the like. Accordingly, if it is possible to develop a technology capable of manufacturing a mechanical part which includes portions each having significantly different target thickness, by forging a single material, by combining this technology and the cold forging, it is possible to provide an ideal technology capable of maximizing advantages (high precision and high strengthening) on the quality of the mechanical part and advantages (low cost and high yield) on a manufacturing process.

The present invention is made in consideration of the above-described circumstances, and an object thereof is to provide a method of manufacturing a mechanical part capable of manufacturing a mechanical part which includes portions each having significantly different target thickness, by forging a single material, and a mechanical part which is manufactured by the manufacturing method.

Means for Solving the Problem

The present invention adopts the following means in order to solve the problems and to achieve the object.

(1) According to an aspect of the present invention, there is provided a method of manufacturing a mechanical part, including: a first process of forming, by performing a folding processing to an end portion of the material, a portion to be processed having a structure, in which a plurality of layers respectively having a thickness corresponding to a plate thickness of a material overlap each other, in the material such that a plate thickness direction of the layer is orthogonal to a plate thickness direction of the material; and a second process of changing, by performing a forging processing to the portion to be processed, a shape of the portion to be processed to a target shape while press-welding the layers of the portion to be processed to each other by plastic deformation.

(2) In the method of manufacturing a mechanical part according to (1), in the first process, the portion to be processed having a structure in which two layers or three layers overlap each other may be formed in the material.

(3) In the method of manufacturing a mechanical part according to (1) or (2), the first process may include: forming, by performing the folding processing to the end portion of the material, a pre-bent portion in which a part having a thickness corresponding to the plate thickness of the material is continuously formed in a zigzag shape, and forming, by adding an external force to the pre-bent portion such that the parts of the pre-bent portion overlap each other, the portion to be processed having a structure in which a plurality of parts overlap each other as the layers.

(4) In the method of manufacturing a mechanical part according to any one of (1) to (3), the first process may include thickening the portion to be processed in the plate thickness direction of the layer by adding a pressing force to the portion to be processed in the plate thickness direction of the material.

(5) In the method of manufacturing a mechanical part according to (4), when a length of the portion to be processed in the plate thickness direction of the layer is defined as a thickness of the portion to be processed, a thickness of the portion to be processed before the thickening is defined as T0, and a thickness of the portion to be processed after the thickening ends is defined as Tcl, in the thickening, a thickening amount of the portion to be processed may be controlled such that a thickening ratio Tra which is obtained by dividing the thickness Tcl by the thickness T0 satisfies the following Conditional Expression (1).

$$1.0 < Tra \leq 1.5 \quad (1)$$

(6) In the method of manufacturing a mechanical part according to any one of (1) to (5), the material may include a protrusion portion and a recessed portion provided on a surface of the material, and in the first process, the folding may be performed such that the protrusion portion and the recessed portion mesh with each other at a boundary interface between the layers of the portion to be processed.

(7) In the method of manufacturing a mechanical part according to any one of (1) to (6), when in both end portions of the portion to be processed in the plate thickness direction of the layer, an end portion farthest from the center of the material is defined as an outer end portion and the other end portion is defined as an inner end portion, the second process may include placing the material in which the portion to be processed is formed on a die, interposing a part of the material except for the portion to be processed between a lower surface of a first punch and the die in a state where a side surface of the die comes into contact with the outer end portion of the portion to be processed, and moving a second punch having a side surface on which an axial pressing protrusion is provided toward the die in the plate thickness direction of the material, pushing the axial pressing protrusion into the inner end portion of the portion to be processed, and changing the shape of the portion to be processed to the target shape while crushing the portion to be processed and press-welding the layers of the portion to be processed by the plastic deformation.

(8) According to another aspect of the present invention, there is provided a mechanical part which is manufactured by the method of manufacturing a mechanical part according to any one of (1) to (7).

(9) According to still another aspect of the present invention, there is provided a mechanical part, including: a first flat portion; and a second portion which is provided on an end portion of the first portion and protrudes in a plate thickness direction of the first portion from a surface of the first portion, and when a length of the second portion in a direction orthogonal to the plate thickness direction of the first portion is defined as a thickness of the second portion, the thickness of the second portion is larger than a plate thickness of the first portion, and when the second portion is viewed from a cross section including the plate thickness direction of the first portion and the thickness direction of the second portion, an interlayer boundary line exists in the second portion.

Effects of the Invention

According to the method of manufacturing a mechanical part of the above-described aspect of the present invention, since a thickness (a length of the portion to be processed in a direction orthogonal to the plate thickness direction of the material) of the portion to be processed which is formed in the material in the manufacturing process is several times the plate thickness of the material, it is possible to manufacture the mechanical part which includes portions each having significantly different target thickness, by forging a single material.

EMBODIMENTS OF THE INVENTION

Hereinafter, embodiments of the present invention will be described in detail with reference to the drawings. In addition, hereinafter, a method of manufacturing a mechanical part according to the present invention, a method is exemplified, in which a toothed part (for example, a toothed part having both structures of a drive plate and a ring gear) which is a component of a vehicular automatic transmission is manufactured by forging a single material. As described above, the toothed part for the automatic transmission is one of mechanical parts in which target thicknesses are greatly different from each other according to a part.

First Embodiment

First, a first embodiment of the present invention will be described.

Figure 1:
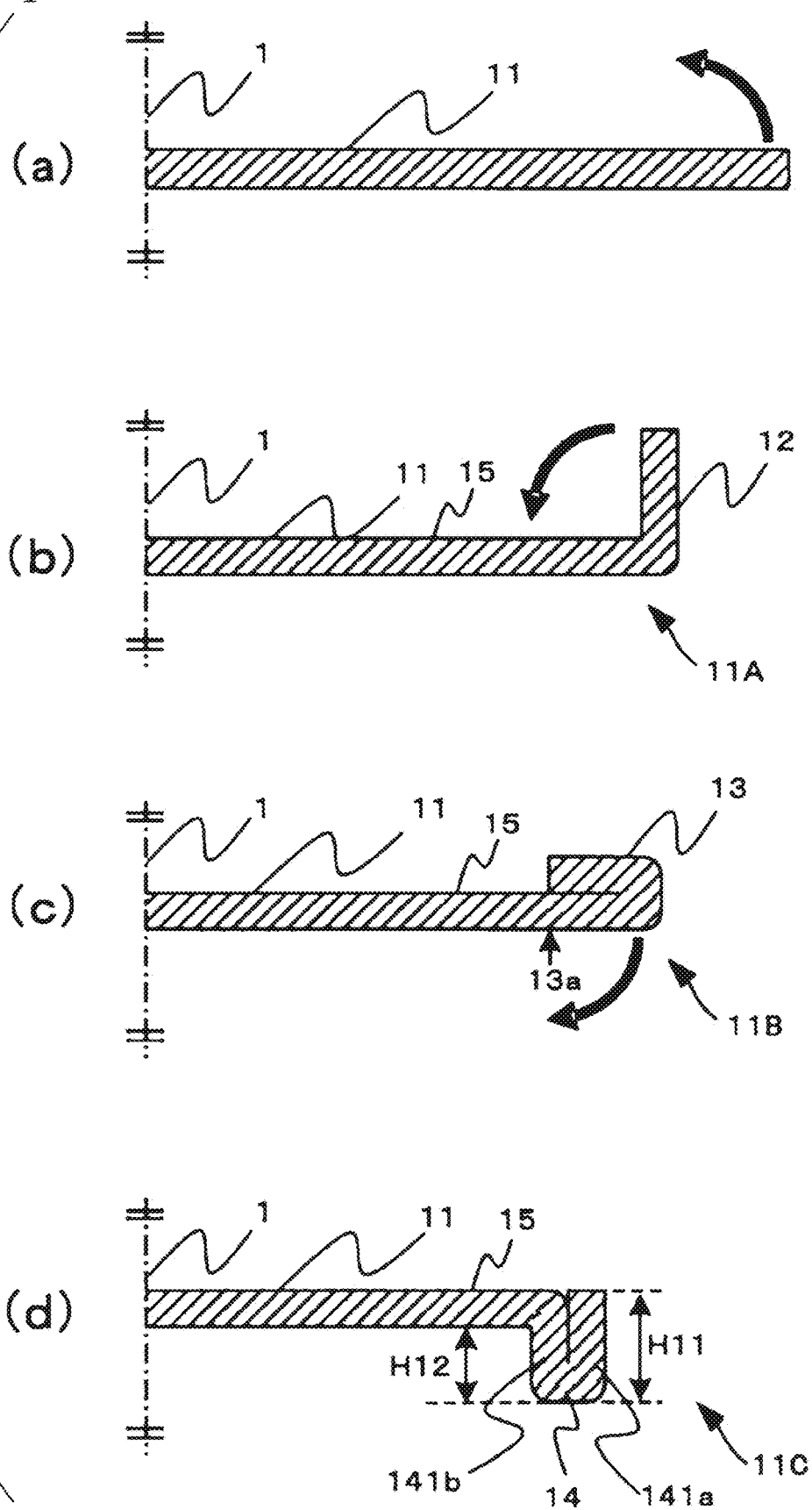
FIG. 1 is an explanatory view of a standing wall portion forming process (double folding forming process) in a method of manufacturing a mechanical part according to a first embodiment.

A method of manufacturing a mechanical part (toothed part) according to the first embodiment includes a standing wall portion forming process (first process) and a tooth forming process (second process). FIG. 1 is an explanatory view of the standing wall portion forming process (double folding forming process). In the present embodiment, a circular metal plate (a steel plate having a circular shape) is used as a material 11. In FIGS. 1, 2 and 4 to 9, in the material 11, a sectional shape of one side portion from a center axis 1 of the material 11 is shown.

In the standing wall portion forming process, first, an outer circumferential portion of the disk-shaped material 11 shown in FIG. 1(a) is folded by 90° into an L shape by drawing, and as shown in FIG. 1(b), a formed part 11A which includes a cup bottom portion 15 and an annular standing wall portion 12 is formed. Continuously, the standing wall portion 12 of the formed part 11A is folded by 90° in the same direction as the bending direction of the preceding process so as to be overlapped on the cup bottom portion 15, and as shown in FIG. 1(c), a formed part 11B having a two-plate stacked outer circumferential portion 13 is formed. In addition, the two-plate stacked outer circumferential portion 13 is folded by 90° in a direction opposite to the bending direction so far from an end 13a of the outer circumferential portion 13 as a base point, and as shown in FIG. 1(d), a formed part 11C having the two-plate stacked standing wall portion 14 is formed.

In the present specification, the fact that the folding directions are the same as each other means that they are the same as each other in the clockwise direction or the counterclockwise direction with respect to the folding base point. In addition, the fact that the folding directions are opposite to each other means a relationship of the counterclockwise direction with respect to the clockwise direction or a relationship of the clockwise direction with respect to the counterclockwise direction.

The standing wall portion 14 rises from the outer circumference of the formed part 11C. In addition, in the two-plate stacked standing wall portion 14, two folded portions 141a and 141b which are obtained by folding the material 11 overlap each other in a radial direction of the formed part 11C. The folded portion 141a is positioned on the outside in the radial direction of the formed part 11C and the folded portion 141b is positioned on the inside in the radial direction of the formed part 11C.

In this way, in the standing wall portion forming process, by folding the outer circumferential portion of the material 11, the standing wall portion 14 (portion to be processed) having a structure in which two layers (folded portions 141a and 141b) having respectively a thickness corresponding to the plate thickness of the material 11 overlap each other is formed in the material 11 such that the plate thickness direction of the layer is orthogonal to the plate thickness direction of the material 11.

Hereinbefore, the standing wall portion forming process ends. In the bending of the above-described standing wall portion forming process, in a case where it is difficult to fold the material 11 by 90 degrees by performing bending once to secure the shape accuracy of the formed part, it is possible to finally fold the material 11 by 90° by performing the bending several times. For example, it is possible to perform the folding twice by 45°.

In the standing wall portion forming process, since a portion of the initial material 11 shown in FIG. 1(a) is folded, the outer diameter of the formed part 11C shown in FIG. 1(d) is smaller than the outer diameter of the initial material 11 shown in FIG. 1(a). In addition, the thickness of each of the folded portions 141a and 141b is approximately the same as the thickness of the initial material 11, the thickness of the standing wall portion 14 in which the two folded portions 141a and 141b overlap each other is thicker than the thickness of the initial material 11. That is, the standing wall portion 14 is thickened. In FIG. 1(d), a height H11 is a length from an upper surface of the cup bottom portion 15 to a tip end surface of the standing wall portion 14, and a height H12 is a length from a lower surface of the cup bottom portion 15 to the tip end surface of the standing wall portion 14.

Figure 2:
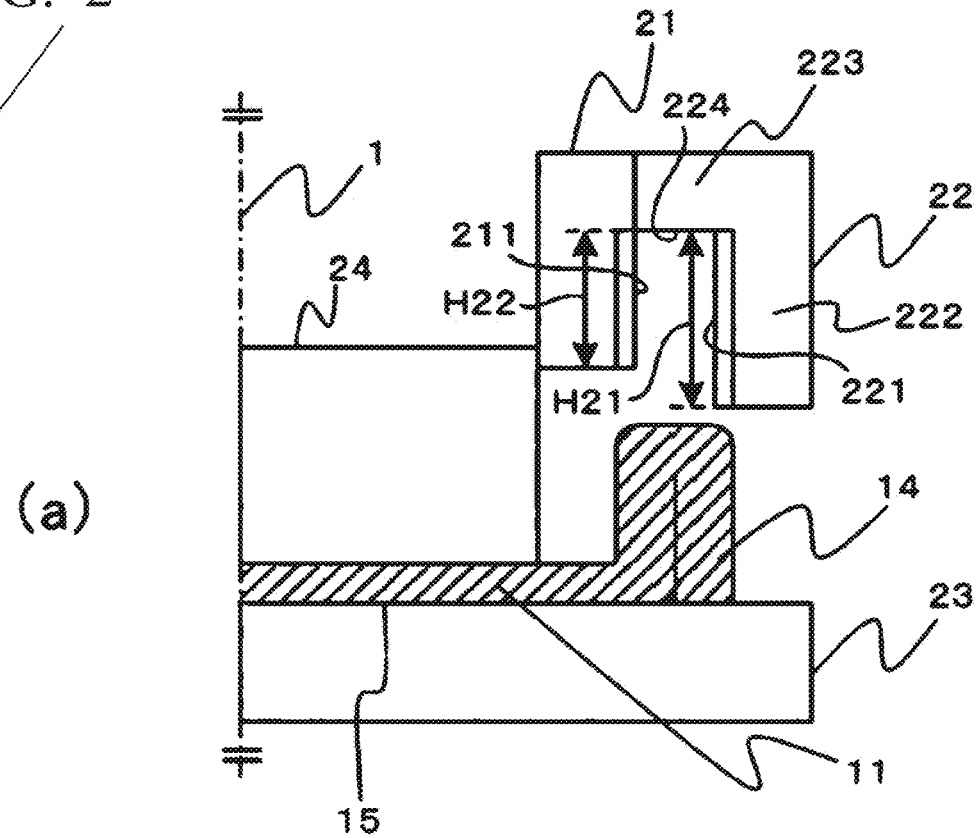
FIG. 2 is an explanatory view of a tooth forming process in the method of manufacturing a mechanical part according to the first embodiment.
Figure 2:
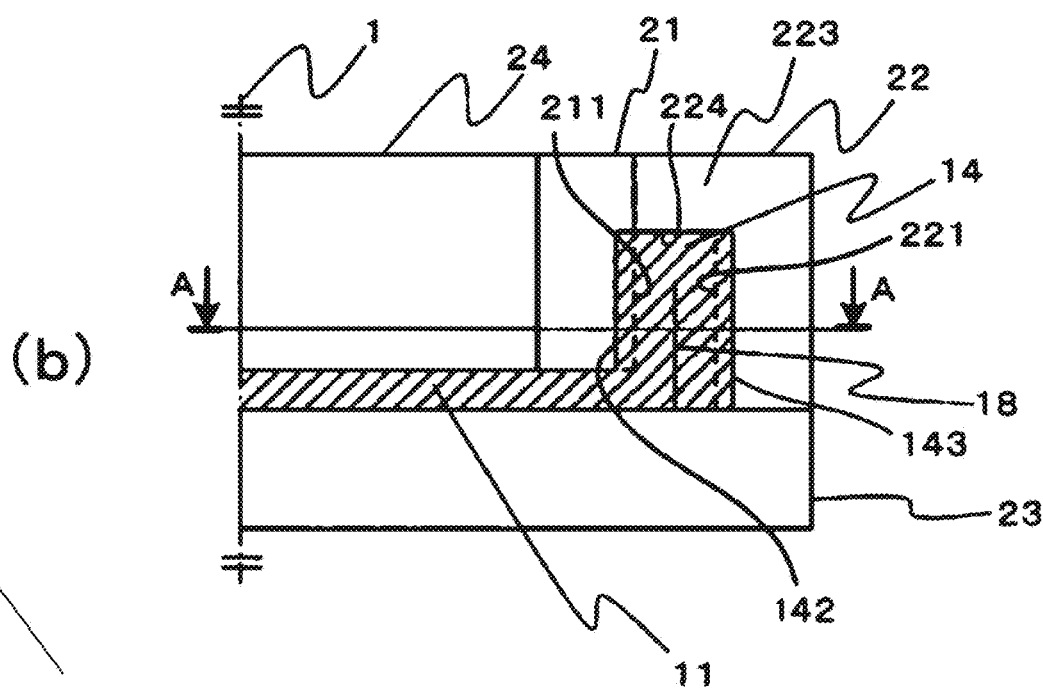

Next, a tooth forming process (press forming process) will be described with reference to FIG. 2.

A press forming device used in the tooth forming process includes, as a forming tool, a die 23 on which the formed part 11C is placed, a columnar plate holder 24 which is disposed to face the die 23, an inner diameter tooth punch 21 which is annularly formed and is disposed outside the outer circumferential surface of the plate holder 24, and an outer diameter tooth punch 22 which is annularly formed and is disposed outside the outer circumferential surface of the inner diameter tooth punch 21. A toothed portion 211 is formed on a portion of the outer circumferential surface of the inner diameter tooth punch 21. The outer diameter tooth punch 22 includes a main body portion 222 in which a toothed portion 221 is formed on the inner circumferential surface, and a holding portion 223 which protrudes from an upper end of the main body portion 222 toward the inside in the radial direction of the outer diameter tooth punch 22. The toothed portions 211 and 221 face each other in the radial directions of the inner diameter tooth punch 21 and the outline tooth punch 22. A lower surface of the holding portion 223 becomes a pressing surface 224 which presses the upper end of the standing wall portion 14. The tip end surface of the holding portion 223 comes into contact with an upper portion of the outer circumferential surface of the inner diameter tooth punch 21. The inner diameter tooth punch 21, the outer diameter tooth punch 22, and the plate holder 24 are disposed in rotational symmetry with respect to the center axis 1, and can independently move upward and downward along the center axis 1. In addition, a height H21 shown in FIG. 2(a) is a height from a lower surface of the main body portion 222 of the outer diameter tooth punch 22 to the pressing surface 224, and is approximately the same as the height H11 shown in FIG. 1(d). Moreover, a height H22 shown in FIG. 2(a) is a height from the lower surface of the inner diameter tooth punch 21 to the pressing surface 224, and is approximately the same as the height H12 shown in FIG. 1(d).

In the tooth forming process, first, the formed part 11C is placed on the die 23 and the plate holder 24 presses the cup bottom portion 15 to the die 23 to fix the formed part 11C to the die 23. Thereafter, the inner diameter tooth punch 21 and the outer diameter tooth punch 22 are pushed into the two-plate stacked standing wall portion 14. In this case, the standing wall portion 14 is pushed by the toothed portion 211 of the inner diameter tooth punch 21 and the toothed portion 221 of the outer diameter tooth punch 22 and is plastically deformed, and is formed (forged) in a tooth shape along to the toothed portions 211 and 221.

The folded portion 141b of the standing wall portion 14 is pressed toward the outside in the radial direction of the formed part 11C by the toothed portion 211 of the inner diameter tooth punch 21, and then, the folded portion 141b plastically flows. The folded portion 141a of the standing wall portion 14 is pressed toward the inside in the radial direction of the formed part 11C by the toothed portion 221 of the outer diameter tooth punch 22 and is plastically fluidized. In addition, the pressing surface 224 prevents the standing wall portion 14 from being plastically fluidized upward. Accordingly, as shown in FIG. 2(b), a toothed portion 142 along to the toothed portion 211 of the inner diameter tooth punch 21 is formed on the inner circumferential surface of the standing wall portion 14, a toothed portion 143 along to the toothed portion 221 of the outer diameter tooth punch 22 is formed on the outer circumferential surface of the standing wall portion 14, and the tooth forming process ends.

In the above-described tooth forming process, the folded portion 141a and 141b receive pressing forces from the toothed portion 211 of the inner diameter tooth punch 21 and the toothed portion 221 of the outer diameter tooth punch 22 and are plastically deformed, and firm fastening (plastic fastening) is realized in a portion (overlapped portion) 18 at which the folded portions 141a and 141b are overlapped on each other. Accordingly, it is possible to obtain necessary and sufficient strength with respect to the standing wall portion 14 in which the folded portions 141a and 141b overlap each other.

Hereinbefore, in the tooth forming process, by forging the standing wall portion 14 (portion to be processed), the shape of the standing wall portion 14 is changed to a target shape (a tooth shape in the present embodiment) while the layers (folded portions 141a and 141b) of the standing wall portion 14 are plastically deformed so as to be fastened (press-welded) to each other.

Figure 3:
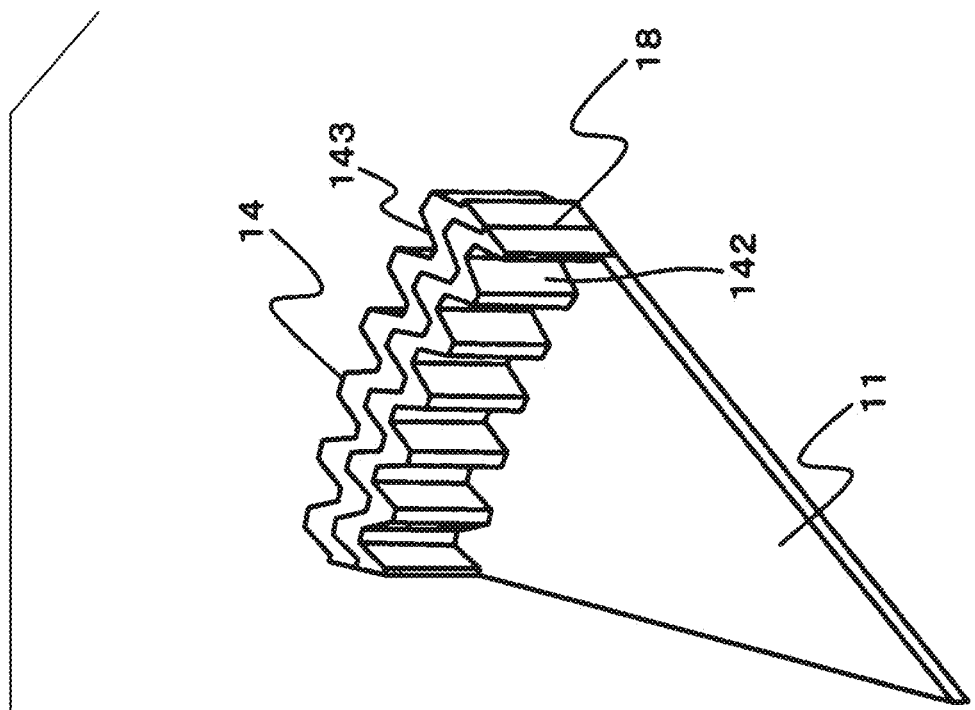
FIG. 3 is a view schematically showing an external appearance of a toothed part which is manufactured by the method of manufacturing a mechanical part according to the first embodiment.
Figure 3:
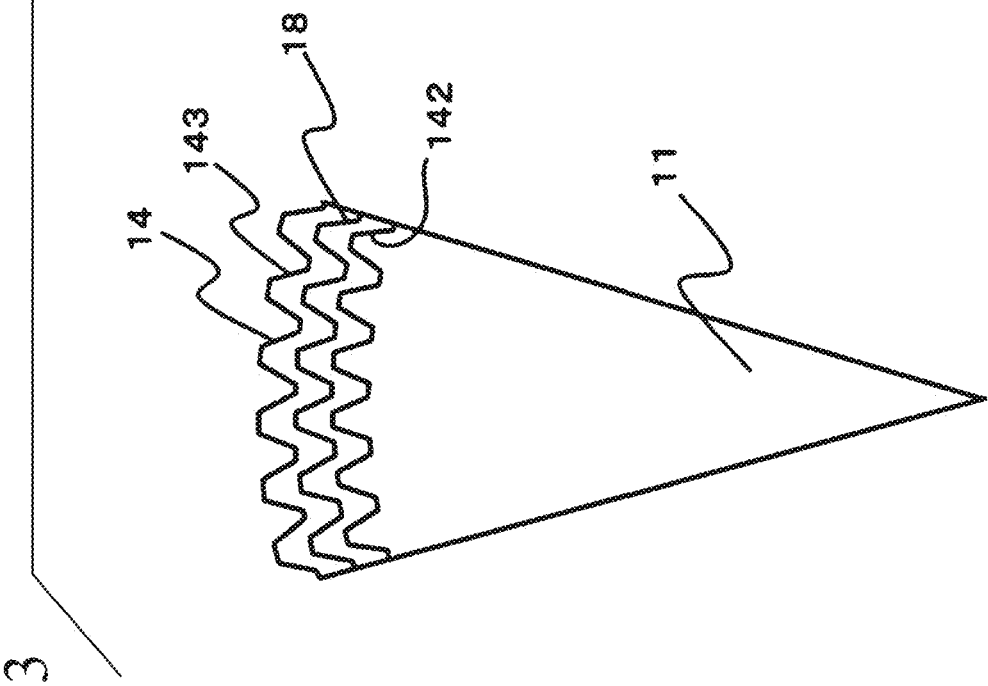
Figure 4:
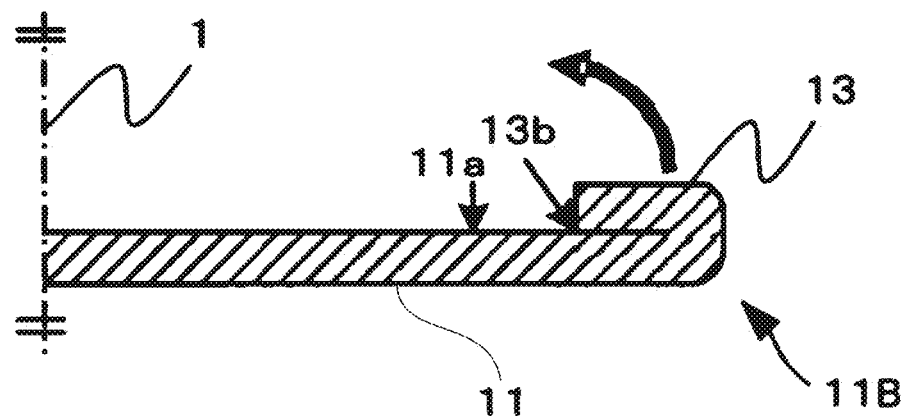
FIG. 4 is an explanatory view of a modification example of the standing wall portion forming process (double folding forming process) in a method of manufacturing a mechanical part according to the first embodiment.
Figure 4:
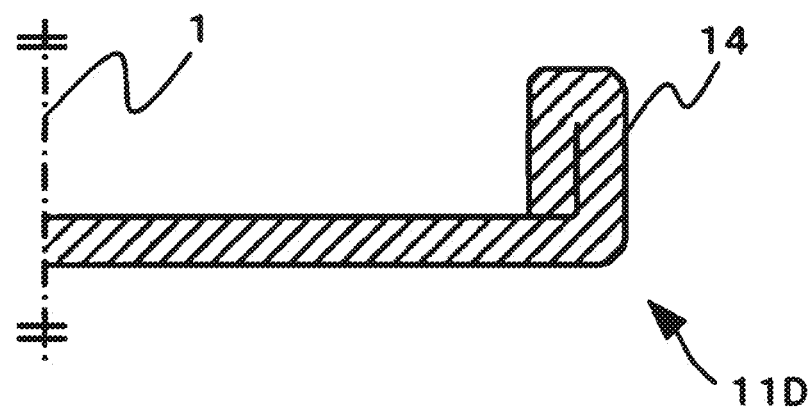
Figure 4:
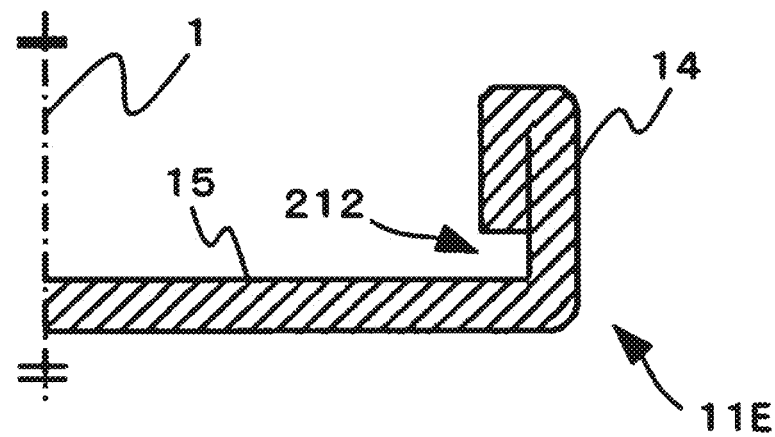
Figure 5:
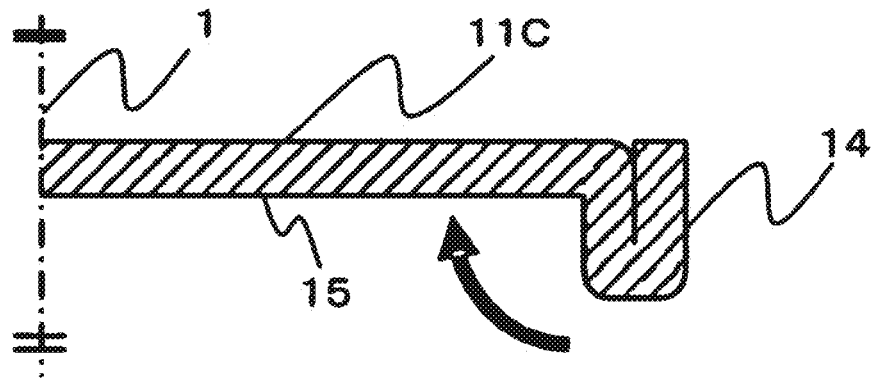
FIG. 5 is an explanatory view of a standing wall portion forming process (triple folding forming process) in a method of manufacturing a mechanical part according to a second embodiment.
Figure 5:
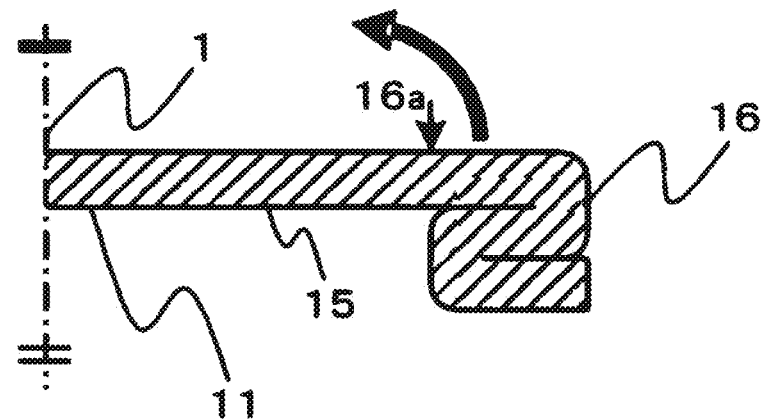
Figure 5:
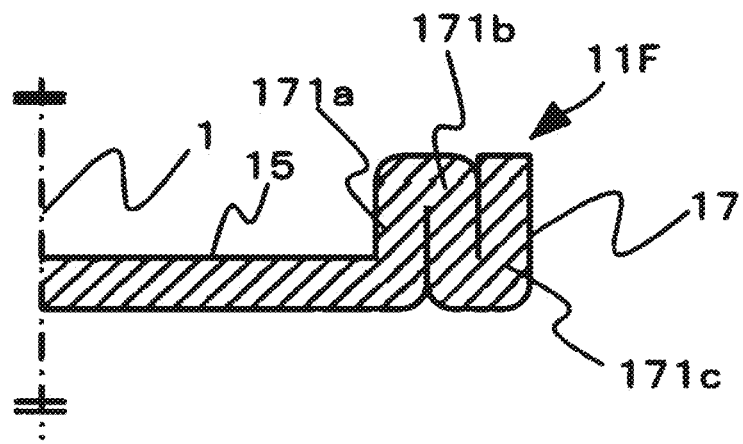
Figure 6:
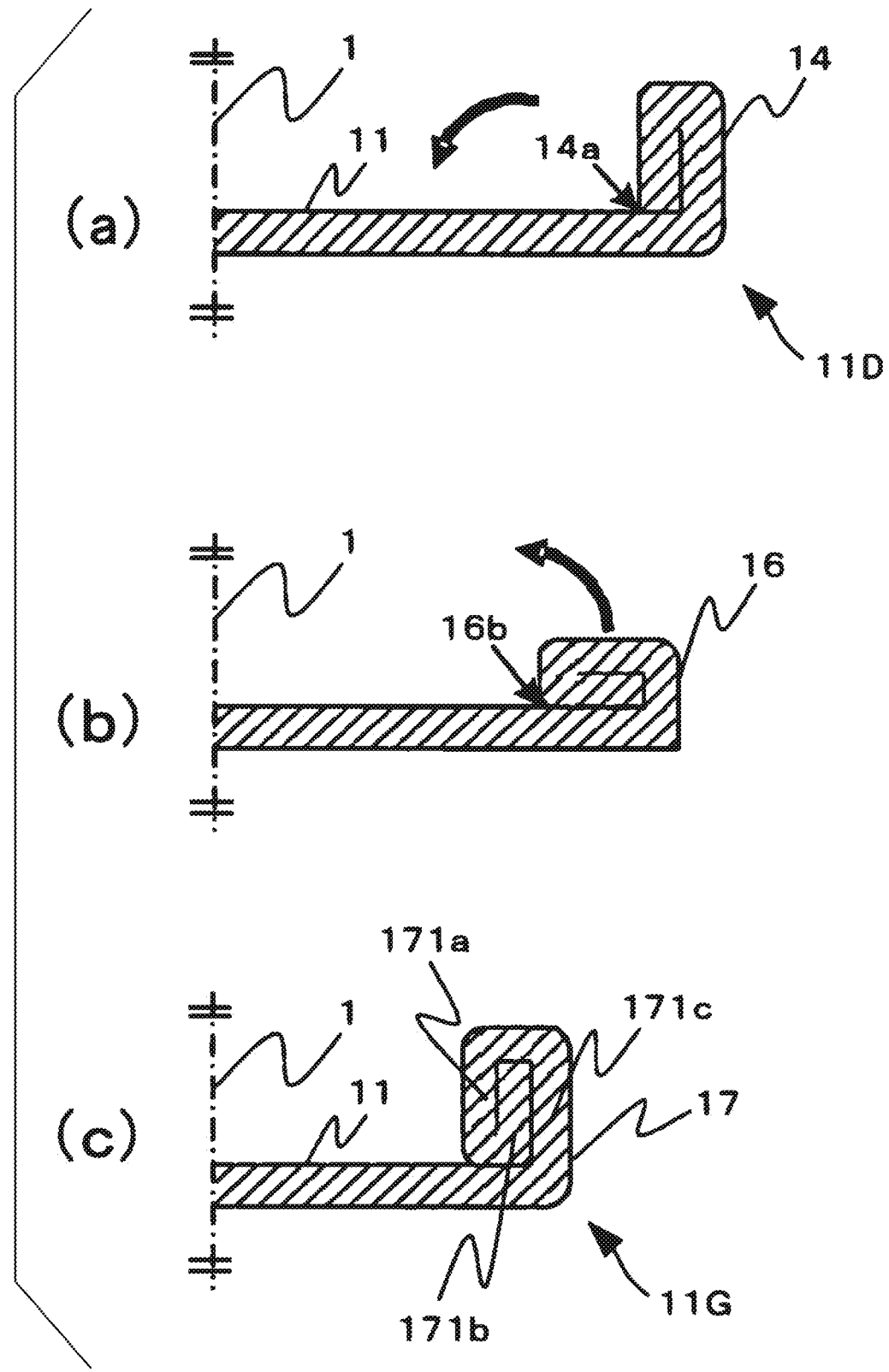
FIG. 6 is an explanatory view of a modification example of the standing wall portion forming process (triple folding forming process) in a method of manufacturing a mechanical part according to the second embodiment.
Figure 7:
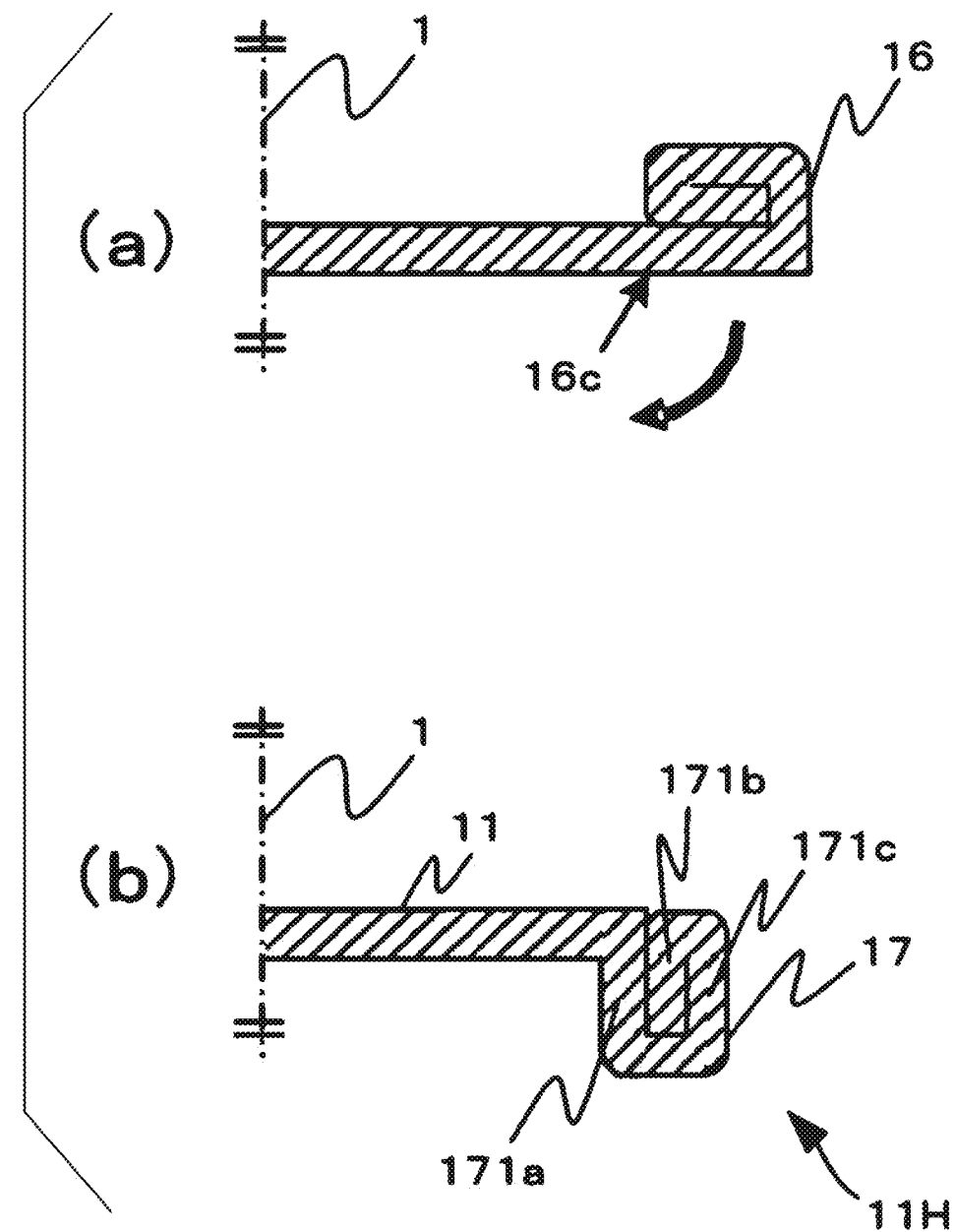
FIG. 7 is an explanatory view of a modification example of the standing wall portion forming process (triple folding forming process) in a method of manufacturing a mechanical part according to the second embodiment.
Figure 8:
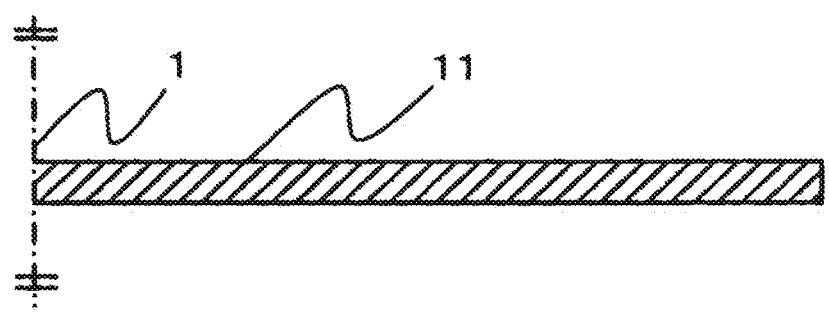
FIG. 8 is an explanatory view of a pre-bending forming process and a bending forming process included in a standing wall portion forming process in a method of manufacturing a mechanical part according to a third embodiment.
Figure 8:
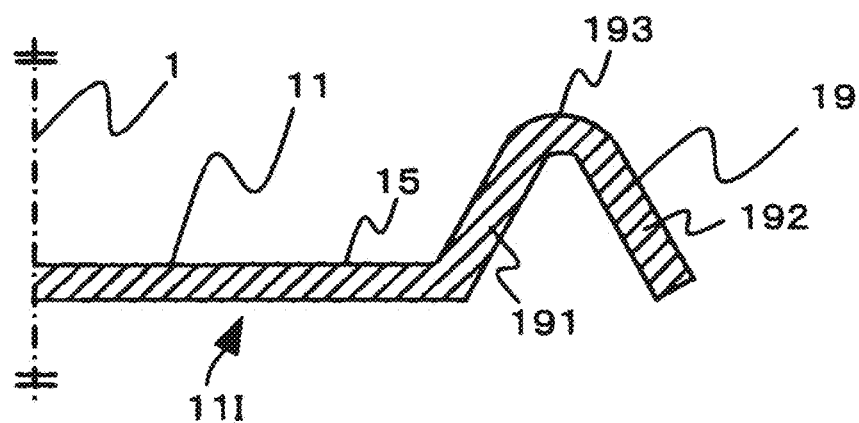
Figure 8:
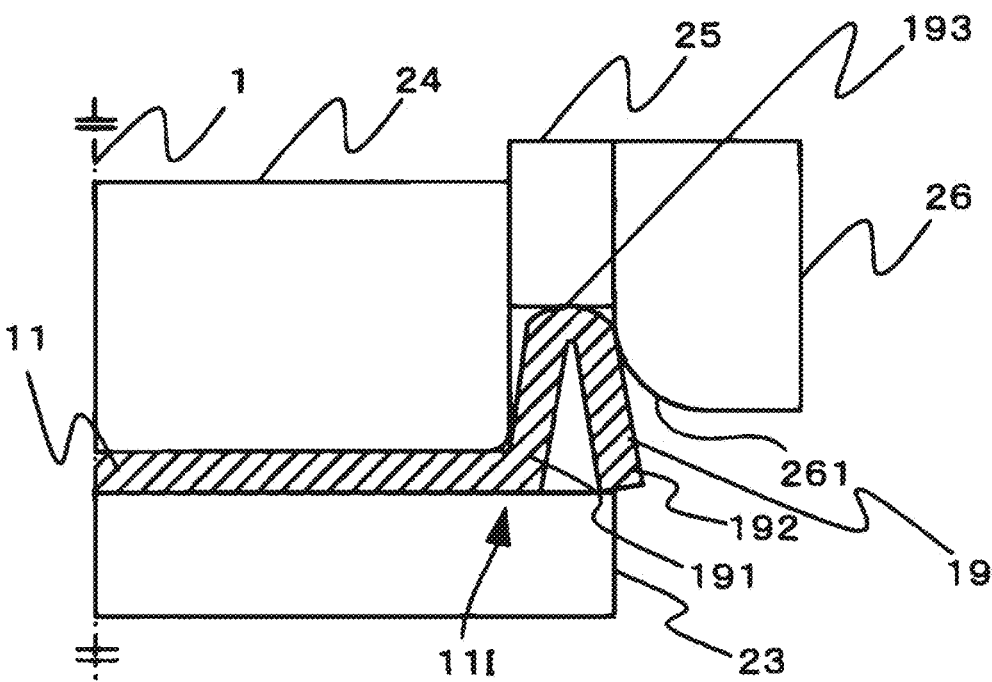
Figure 9:
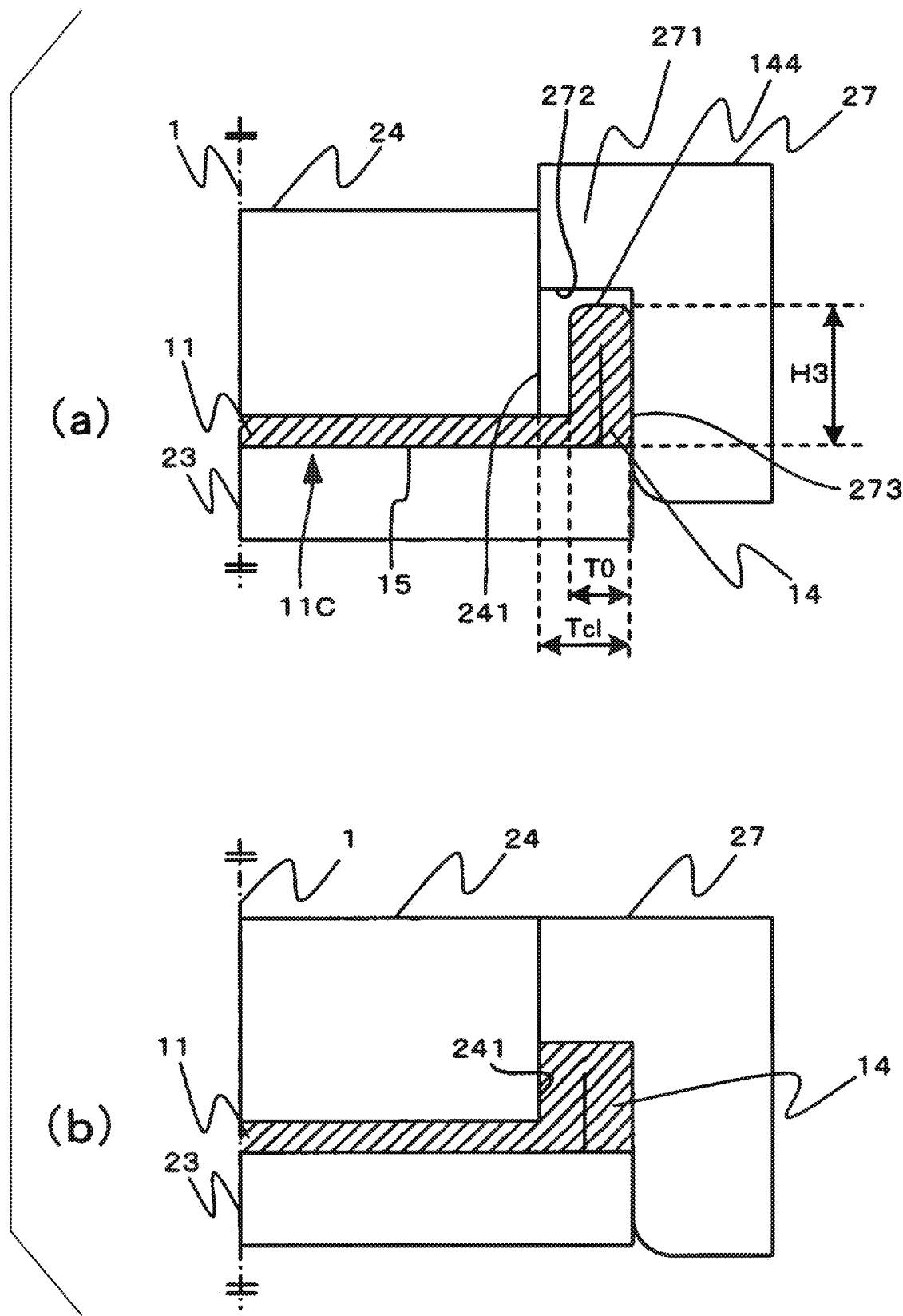
FIG. 9 is an explanatory view of a thickening process included in a standing wall portion forming process in a method of manufacturing a mechanical part according to a fourth embodiment.

Schematic views of a cross section taken along line A-A of FIG. 2(b) in the standing wall portion 14 are shown in FIGS. 3(a) and 3(b). In FIGS. 3(a) and 3(b), a portion of a final formed part (toothed part) which is formed by the tooth forming process is shown.

As shown in FIGS. 3(a) and 3(b), a toothed part having both structures of a drive plate and a ring gear is obtained by the method of manufacturing a mechanical part according to the present embodiment. That is, the toothed part includes a first flat portion (a part corresponding to the drive plate, that is, a part except for the standing wall portion 14) and a second portion (a part corresponding to the ring gear, that is, the standing wall portion 14 including the toothed portions 142 and 143) which is provided on the end portion of the first portion and protrudes in the plate thickness direction of the first portion from the surface of the first portion.

The thickness of the first portion (a part corresponding to the drive plate) is the same as the thickness of the material 11. However, the thickness of the second portion (the standing wall portion 14 corresponding to the ring gear) is approximately two times the thickness of the material 11. Here, the thickness of the second portion indicates the length of the standing wall portion 14 in the radial direction (a direction orthogonal to the plate thickness direction of the material 11) of the toothed part. That is, when the second portion is viewed from a cross section (a cross section orthogonal to the circumferential direction of the material 11) including the plate thickness direction of the first portion and the thickness direction of the second portion, an interlayer boundary line (that is, the overlapped portion 18) exists in the second portion.

In this way, according to the method of manufacturing a mechanical part according to the present embodiment, it is possible to manufacture the mechanical part, in which the target thicknesses are greatly different from each other according to a part, by forging a single material. Accordingly, by combining cold forging with the method of manufacturing a mechanical part according to the present embodiment, it is possible to maximize advantages (high precision and high strengthening) on the quality of the mechanical part and advantages (low cost and high yield) on a manufacturing process.

In addition, the tooth forming process in which the toothed portions 142 and 143 are forged in the standing wall portion 14 is not limited to the one process shown in the present embodiment. From required characteristics such as forming ability of press forming, strength of the die and punch, or dimensional accuracy of the toothed portions 142 and 143, processes such as performing for decreasing the maximum load or re-striking for dimensional accuracy may be provided if necessary.

In addition, the toothed portion 143 is formed only on the outer circumferential surface of the standing wall portion 14 using a cylindrical inner diameter punch without the toothed portion 211 instead of the inner diameter tooth punch 21. In this case, when the toothed portion 143 is formed, it is possible to plastically fasten the overlapped portion 18. Moreover, the toothed portion 142 is formed only on the inner circumferential surface of the standing wall portion 14 using a cylindrical outer diameter punch without the toothed portion 221 instead of the outer diameter tooth punch 22. In this case, when the toothed portion 142 is formed, it is possible to plastically fasten the overlapped portion 18. In addition, in the present embodiment, the configuration of the die and punch divided into the inner diameter tooth punch 21 and the outer diameter tooth punch 22 is exemplified. However, the configuration of the die and punch in which the inner diameter tooth punch 21 and the outer diameter tooth punch 22 are integrated with each other may be adopted.

Modification Example 1 of First Embodiment

In the standing wall portion forming process, as shown in FIG. 4(a), the two-plate stacked outer circumferential portion 13 of the formed part 11B shown in FIG. 1(c) is folded by 90° in the same direction as the bending direction until the FIG. 1(b) from the end 13b of the outer circumferential portion 13 as a base point, and as shown in FIG. 4(b), a formed part 11D having the two-plate stacked standing wall portion 14 may be formed.

Modification Example 2 of First Embodiment

In the formed part 11B having the two-plate stacked outer circumferential portion 13 shown in FIG. 4(a), the two-plate stacked outer circumferential portion 13 is folded by 90° in the same direction as the bending direction until the FIG. 1(b) from a point 11a closer to the center axis 1 than the end 13b of the outer circumferential portion 13 as a base point whereby, as shown in FIG. 4(c), a formed part 11E having a two-plate stacked standing wall portion 14 can be formed. In the formed part 11E, a gap 212 is formed between the inner diameter side portion of the standing wall portion 14 and the cup bottom portion 15. By performing the above-described tooth forming process on the formed parts 11D and 11E of Modification Examples 1 and 2, the toothed part is formed, in which the toothed portion 142 is formed on the inner circumferential surface of the standing wall portion 14 and the toothed portion 143 is formed on the outer circumferential surface of the standing wall portion 14. In the toothed part obtained from the formed part 11E, the gap 212 is formed between the inner diameter side toothed portion 142 and the cup bottom portion 15. Accordingly, the formed part 11E of FIG. 4(c) is suitable for forming the toothed part having the gap 212 between the inner diameter side toothed portion 142 and the cup bottom portion 15.

Second Embodiment

Next, a second embodiment of the present invention will be described.

Similarly to the first embodiment, a method of manufacturing a mechanical part (toothed part) according to the second embodiment also includes the standing wall portion forming process (first process) and the tooth forming process (second process). In the first embodiment, the case where the standing wall portion 14 (portion to be processed) having the two-layer structure is formed in the material 11 in the standing wall portion forming process is exemplified. Meanwhile, the second embodiment is different from the first embodiment in that a standing wall portion 17 (portion to be processed) having a three-layer structure is formed in the material 11 in the standing wall portion forming process.

FIGS. 5(a) to 5(c) are explanatory views of a standing wall portion forming process (triple folding forming process) in which the material 11 is folded in triplicate. Since the process until the process of FIG. 5(a) in which the material 11 is doubly folded is the same as the process until FIG. 1(d) of the first embodiment, descriptions thereof are omitted. The two-plate stacked standing wall portion 14 shown in FIG. 5(a) is further folded by 90° to be overlapped on the cup bottom portion 15, and as shown in FIG. 5(b), a three-plate stacked outer circumferential portion 16 is formed. In addition, an end 16a of the three-plate stacked outer circumferential portion 16 is bent and folded by 90° in a direction opposite to the bending direction of the preceding process, and as shown in FIG. 5(c), a formed part 11F having a three-plate stacked standing wall portion 17 is formed. In the standing wall portion 17 which is formed in this way, three folded portions 171a, 171b, and 171c overlap each other in the radial direction of the formed part 11F. Similarly to the first embodiment, in the folding, the material 11 may not be folded by 90° at a time, and for example, the folding may be performed twice by 45°.

In this way, in the standing wall portion forming process of the second embodiment, by folding the outer circumferential portion of the material 11, the standing wall portion 17 (portion to be processed) having the structure in which three layers (folded portions 171a, 171b, and 171c) having respectively a thickness corresponding to the plate thickness of the material 11 overlap each other such that the plate thickness direction of the layer is formed in the material 11.

Compared to the standing wall portion forming process of the first embodiment, in the standing wall portion forming process of the present embodiment, the outer circumferential portion of the material 11 is further folded in the inside in the radial direction of the material 11. Accordingly, the outer diameter of the formed part 11F is smaller than the outer diameter of the formed part 11C shown in FIG. 1(d). In addition, in the standing wall portion 17, since the three folded portions 171a, 171b, and 171c overlap each other, the thickness of the standing wall portion 17 is larger than the thickness of the standing wall portion 14 shown in FIG. 1(d) in which the two folded portions 141a and 141b overlap each other. That is, the standing wall portion 17 of the present embodiment is further thickened than the standing wall portion 14 of the first embodiment.

Accordingly, in the second embodiment, in the toothed part which is obtained after the tooth forming process ends, the thickness of the part (the part except for the standing wall portion 17) corresponding to the drive plate is the same as the thickness of the material 11. However, the thickness of the part (the standing wall portion 17 having the tooth shape) corresponding to the ring gear can be approximately three times the thickness of the material 11.

Modification Example 1 of Second Embodiment

In the above-described second embodiment, the formed part 11F having the three-plate stacked standing wall portion 17 shown in FIG. 5(c) is formed using the formed part 11C having the two-plate stacked standing wall portion 14 shown in FIG. 1(d) in the state where the folding direction is inverted. Meanwhile, in the present Modification Example 1, as shown in FIG. 6(c), a formed part 11G having the three-plate stacked standing wall portion 17 may be formed using the formed part 11D having the two-plate stacked standing wall portion 14 shown in FIG. 4(b) in a state where the folding direction is not changed.

FIGS. 6(a) to 6(c) are explanatory views of a standing wall portion forming process (triple folding forming process) in which the material 11 is folded in triplicate. Since the process until FIG. 6(a) in which the material 11 is doubly folded to form the formed part 11D having the two-plate stacked standing wall portion 14 is the same as the process of FIG. 4(b) of Modification Example 1 of the first embodiment, descriptions thereof are omitted. The two-plate stacked standing wall portion 14 shown in FIG. 6(a) is further folded by 90° in the same direction as the bending direction of the preceding process from an end 14a in the inside in the radial direction as a base point to be overlapped on the cup bottom portion 15, and as shown in FIG. 6(b), the three-plate stacked outer circumferential portion 16 is formed. In addition, the three-plate stacked outer circumferential portion 16 is folded by 90° in the same direction as the bending direction of the preceding process from an end 16b in the inside in the radial direction as a base point, and as shown in FIG. 6(c), the formed part 11G having the three-plate stacked standing wall portion 17 is formed. In the standing wall portion 17 which is formed in this way, the three folded portions 171a, 171b, and 171c overlap each other in the radial direction of the formed part 11G. Similarly to the first embodiment, in the present Modification Example 1, in the folding, the material 11 may not be folded by 90° at a time, and for example, the folding may be performed twice by 45°.

Modification Example 2 of Second Embodiment

FIGS. 7(a) and 7(b) are explanatory views of a standing wall portion forming process (triple folding forming process) in which the material 11 is folded in triplicate. Since the process until FIG. 7(a) in which the three-plate stacked outer circumferential portion 16 is formed is the same as the process until FIG. 6(b) of Modification Example 1 of the second embodiment, descriptions thereof are omitted. In the Modification Example 1 of the second embodiment, the three-plate stacked outer circumferential portion 16 is folded by 90° in the same direction as the bending direction of the preceding process, and as shown in FIG. 6(c), the formed part 11G having the three-plate stacked standing wall portion 17 is formed. Meanwhile, in the present Modification Example 2, the three-plate stacked outer circumferential portion 16 is folded by 90° in the direction opposite to the bending direction of the preceding process, and as shown in FIG. 7(b), a formed part 11H having the three-plate stacked standing wall portion 17 is formed. In the standing wall portion 17 which is formed in this way, the three folded portions 171a, 171b, and 171c overlap each other in the radial direction of the formed part 11H. Similarly to the first embodiment, in the folding, the material 11 may not be not folded by 90° at a time, and for example, the folding may be performed twice by 45°.

The folding may not be limited to triple, by folding the material 11 while appropriately changing the bending direction, four or more folded portion can overlap each other to configure a standing wall portion.

Since the tooth forming process with respect to the standing wall portion 17 in which three folded portions 171a, 171b, and 171c overlap each other is similar to that of the first embodiment, descriptions thereof are omitted.

Third Embodiment

Next, a third embodiment of the present invention will be described.

Similarly to the first embodiment, a method of manufacturing a mechanical part (toothed part) according to the third embodiment also includes the standing wall portion forming process (first process) and the tooth forming process (second process). The third embodiment is similar to the first embodiment in that the standing wall portion 14 (portion to be processed) having a two-layer structure is formed in the material 11 in the standing wall portion forming process. However, the forming process is different from that of the first embodiment.

In the first embodiment, the case where the standing wall portion 14 is formed by overlapping two folded portions 141a and 141b while folding the material 11 is exemplified. In addition, in the second embodiment, the case where the standing wall portion 17 is formed by overlapping three folded portions 171a, 171b, and 171c while folding the material 11 is exemplified. However, in a case where a metal plate having a low bending limit is used as the material 11 or in a case where the initial plate thickness of the material 11 is thick, since tensile stress occurs on the outer surface of the folded portion after the folding, there is a concern that cracks occur on the outer surface of the folded portion. Meanwhile, in the standing wall portion forming process of the third embodiment shown in FIGS. 8(a) to 8(c), by performing a pre-bending forming process on the outer circumferential portion of the material 11 shown in FIG. 8(a) within a range in which bending cracks are not generated, as shown in FIG. 8(b), a formed part 11I having a pre-bent portion 19 is formed. The pre-bent portion 19 includes a tapered folded portion 191 which obliquely rises toward the outside in the radial direction from the cup bottom portion 15, and a tapered folded portion 192 which is inclined downward from the upper end portion of the folded portion 191 toward the outside in the radial direction. A bent outer surface 193 is an outer surface of a portion which connects the folded portions 191 and 192 to each other.

In this way, the pre-bending forming process included in the standing wall portion forming process of the third embodiment, by folding the outer circumferential portion of the material 11, the pre-bent portion 19 is formed in which the part (the folded portions 191 and 192) having the thickness corresponding to the plate thickness of the material 11 is formed to be continuous in a zigzag shape.

Next, a bending forming process in which the standing wall portion 14 is formed from the pre-bent portion 19 is performed using a press forming device shown in FIG. 8(c). In addition to the die 23 and the plate holder 24 similar to those of the first embodiment, the press forming device includes a bend portion pushing punch 25 which is annularly formed and is disposed outside the outer circumferential surface of the plate holder 24 and a drawing punch 26 which is annularly formed and is disposed outside the outer circumferential surface of the bend portion pushing punch 25. A punch shoulder R portion 261 which is formed of a curved surface is formed on the lower end of the inner circumferential surface of the drawing punch 26.

The formed part 11I is placed on the die 23, the plate holder 24 presses the cup bottom portion 15 of the formed part 11I to the die 23, and the formed part 11I is fixed to the die 23. Moreover, by moving the drawing punch 26 downward while pressing the bent outer surface 193 of the pre-bent portion 19 using the bend portion pushing punch 25, the pre-bent portion 19 is deformed by the punch shoulder R portion 261 and the inner circumferential surface of the drawing punch 26. Accordingly, the folded portion 192 is close to the folded portion 191, and the folded portions 191 and 192 overlap each other between the outer circumferential surface of the plate holder 24 and the inner circumferential surface of the drawing punch 26. Since the bent outer surface 193 is pressed by the bend portion pushing punch 25, when the pre-bent portion 19 is folded, tensile stress acting on the bent outer surface 193 is alleviated, and a bending limit is improved. As a result, bending cracks do not occur on the bent outer surface 193 of the pre-bent portion 19, and it is possible to form the standing wall portion 14 in which the two folded portions 191 and 192 overlap each other.

In this way, in the bending forming process included in the standing wall portion forming process of the third embodiment, by applying an external force to the pre-bent portion 19 such that the folded portions 191 and 192 of the pre-bent portion 19 overlap each other, the standing wall portion 14 having the two-layer structure in which the folded portions 191 and 192 overlap each other as layers is formed.

In the present embodiment, the two folded portions 191 and 192 are formed by the pre-bending forming process. However, the present invention is not limited to this, and it is possible to form three or more folded portions. After three or more folded portions are formed by the pre-bending forming process, the three or more folded portions overlap each other using the press machine described in the present embodiment, and the standing wall portion 14 can be formed.

Since the tooth forming process with respect to the standing wall portion 14 is similar to that of the first embodiment, descriptions thereof are omitted.

Fourth Embodiment

Next, a fourth embodiment of the present invention will be described.

Similarly to the first embodiment, a method of manufacturing a mechanical part (toothed part) according to the fourth embodiment also includes the standing wall portion forming process (first process) and the tooth forming process (second process). The fourth embodiment is similar to the first embodiment in that the standing wall portion 14 (portion to be processed) having a two-layer structure is formed in the material 11 in the standing wall portion forming process. However, the forming process is different from that of the first embodiment.

That is, in the first embodiment, the standing wall portion 14 is thickened only by folding the material 11. Meanwhile, in the fourth embodiment, not only the material 11 is folded but also the thickness itself of the material 11 is increased.

As shown in FIGS. 9(a) and 9(b), the standing wall portion forming process of the fourth embodiment includes a process (thickening process) of increasing the thickness of the standing wall portion 14. In addition to the die 23 and the plate holder 24 similar to those of the first embodiment, the press machine used in the thickening process includes a thickening punch 27 which is disposed outside the outer circumferential surface of the plate holder 24. The thickening punch 27 includes a pushing portion 271 which protrudes toward the inside in the radial direction of the thickening punch 27. A lower surface of the pushing portion 271 becomes a thickening punch pushing surface 272. A tip end surface of the pushing portion 271 is in contact with the outer circumferential surface of the plate holder 24.

Similarly to the first embodiment, the formed part 11C in which the standing wall portion 14 is formed is placed on the die 23, the plate holder 24 presses the cup bottom portion 15 to the die 23, and the formed part 11C is fixed to the die 23. In this case, a radial clearance Tcl which is formed by the outer circumferential surface 241 of the plate holder 24 and the inner circumferential surface 273 of the thickening punch 27 is larger than a thickness T0 of the standing wall portion 14 in the radial direction of the formed part 11C. Next, the thickening punch 27 moves downward, and the bent outer surface 144 of the standing wall portion 14 is pressed by the thickening punch pushing surface 272 of the thickening punch 27. Accordingly, the standing wall portion 14 is vertically pressed and is widened in the radial direction of the formed part 11C, and as shown in FIG. 9(b), the inner circumferential surface of the standing wall portion 14 comes into contact with the outer circumferential surface 241 of the plate holder 24. Accordingly, the thickness of the standing wall portion 14 increases and the standing wall portion 14 is thickened.

In this way, in the thickening process included in the standing wall portion forming process of the fourth embodiment, by applying a pressing force to the standing wall portion 14 in the plate thickness direction of the material 11, the standing wall portion 14 is thickened in the plate thickness direction (that is, the radial direction of the material 11) of the layer.

Here, if the thickness of the standing wall portion 14 before the thickening process is defined as T0 and the thickness of the standing wall portion 14 after the thickening process ends is Tcl, in the thickening process, a thickening amount of the standing wall portion 14 is controlled such that a thickening ratio Tra which is obtained by dividing the thickness Tcl by the thickness T0 satisfies the following Conditional Expression (1).

$$1.0 < Tra \leq 1.5 \tag{1}$$

Since forming defects such as buckling or seams easily occur in the standing wall portion 14 as the thickening ratio Tra increases, preferably, the thickening ratio Tra is set to the range shown in the Conditional Expression (1).

In addition, forming defects such as buckling or seams easily occur as a height H3 (FIG. 9(a)) of the standing wall portion 14 increases. Accordingly, in a case where it is desired to increase the height H3 of the standing wall portion 14, preferably, the number of the folded portions configuring the standing wall portion 14 increases to increase the thickness T0 of the standing wall portion 14 in the radial direction of the formed part 11C and to decrease the thickening ratio Tra.

In addition, a process of thickening a standing wall portion in which three or more folded portions overlap each other also is similar to the thickening process of the standing wall portion 14 described in the present embodiment. Since the standing wall portion forming process of forming the standing wall portion 14 of FIG. 9(a) on the outer circumferential portion of the material 11 and the tooth forming process with respect to the thickened standing wall portion 14 of FIG. 9(b) are similar to those of the first embodiment, descriptions thereof are omitted.

Fifth Embodiment

Next, a fifth embodiment of the present invention will be described.

Similarly to the first embodiment, a method of manufacturing a mechanical part (toothed part) according to the fifth embodiment also includes the standing wall portion forming process (first process) and the tooth forming process (second process). The fifth embodiment is similar to the first embodiment in that the standing wall portion 14 (portion to be processed) having a two-layer structure is formed in the material 11 in the standing wall portion forming process. However, the fifth embodiment is different from the first embodiment in that projection portions 111 (protrusion portions) and groove portions 112 (recessed portions) are provided in the material 11.

In fifth embodiment, as shown in FIGS. 10(a) and 10(b) and FIGS. 11(a) to 11(d), the groove portions 112 (recessed portions) and the projection portions 111 (protrusion portions) are provided on the outer circumferential portion of one surface (that is, upper surface) 11b of the material 11. In the present embodiment, as shown FIGS. 11(a) to 11(d), in the standing wall portion forming process, the two-plate stacked standing wall portion 14 is formed by folding the outer circumferential portion of the material 11 such that an uneven shape is positioned on a portion (overlapped portion) 18 on which the folded portions 141a and 141b are overlapped.

Figure 10:
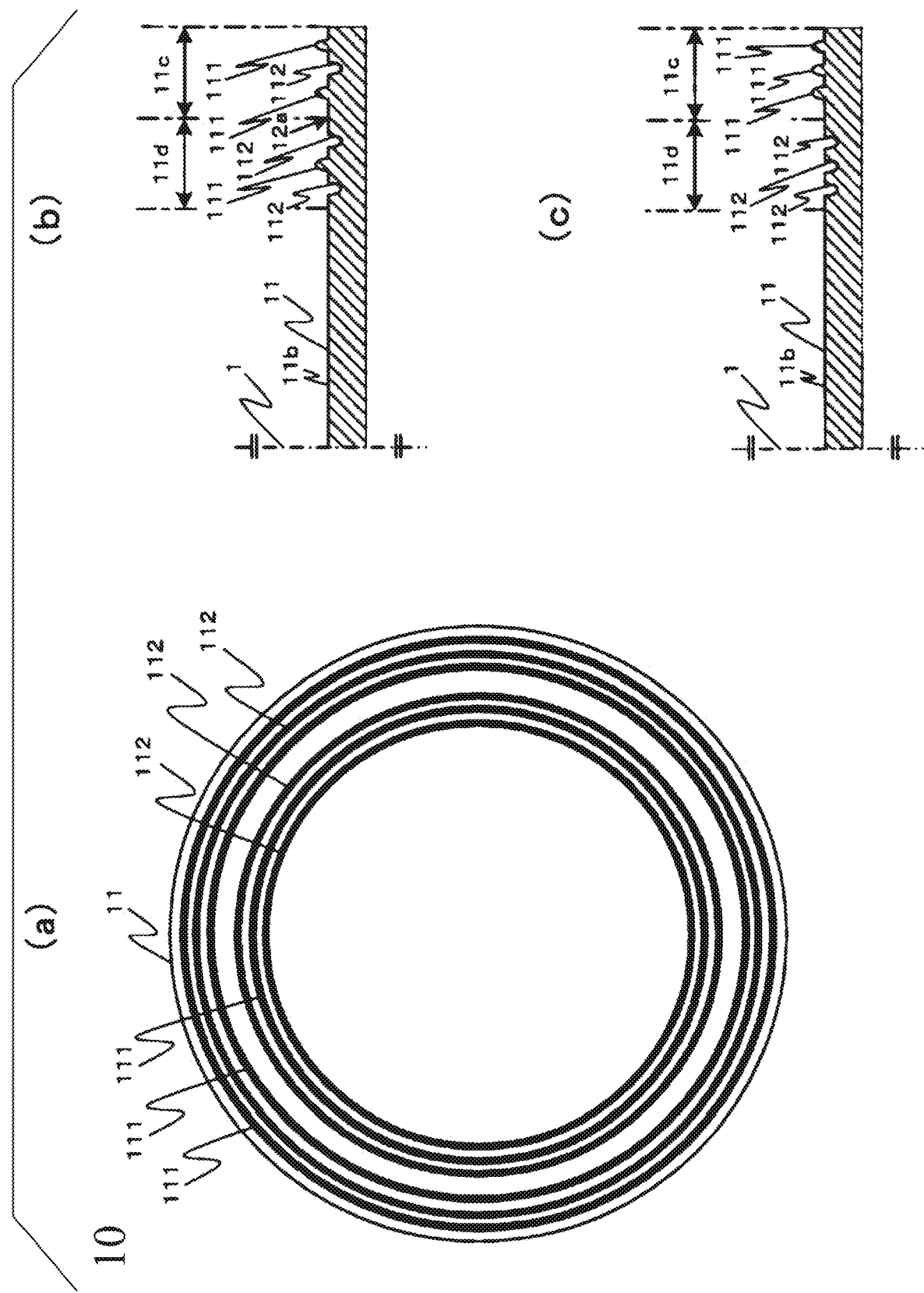
FIG. 10 is an explanatory view of a material used in a method of manufacturing a mechanical part according to a fifth embodiment.

In the present embodiment, as shown in FIGS. 10(a) and 10(b), the plurality of the annular groove portions 112 and projection portions 111 are coaxially provided on the outer circumferential portion of the upper surface 11b of the material 11. As shown in FIG. 10(b), the uneven shape formed by the groove portions 112 and the projection portions 111 is point-symmetric about a reference point 12a.

In a region 11c which is positioned outside the reference point 12a in the radial direction of the material 11, the projection portion 111, the groove portion 112, and the projection portion 111 are disposed in this order from the inside in the radial direction of the material 11 toward the outside in the radial direction. In a region 11d which is positioned inside the reference point 12a in the radial direction of the material 11, the groove portion 112, the projection portion 111, and the groove portion 112 are disposed in this order from the outside in the radial direction of the material 11 toward the inside in the radial direction. In addition, as shown in FIG. 10(c), only the projection portions 111 may be disposed in the region 11c and only the groove portions 112 may be disposed in the region 11d. Moreover, only the groove portions 112 may be disposed in the region 11c and only the projection portions 111 may be disposed in the region 11d. Each of the groove portions 112 and the projection portions 111 may not have an annular shape shown in FIG. 10(a).

Figure 11:
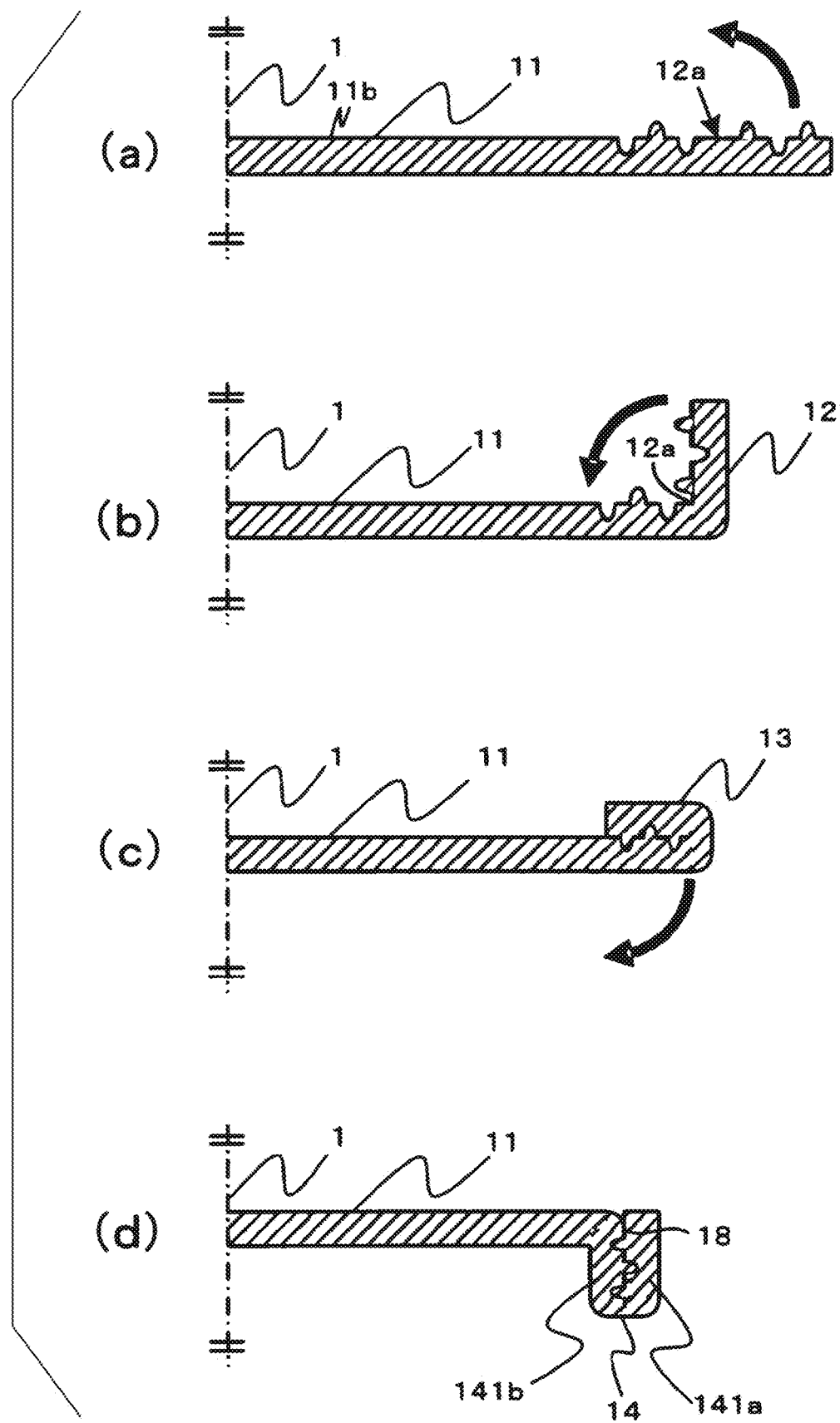
FIG. 11 is an explanatory view of a standing wall portion forming process in the method of manufacturing a mechanical part according to a fifth embodiment.

The region 11c and the region 11d configure the two-plate stacked standing wall portion 14 shown in FIG. 11(d). That is, the region 11c configures the folded portion 141a and the region 11d configures the folded portion 141b. In the present embodiment, since the regions 11c and 11d becoming the folded portions 141a and 141b have uneven shapes (projection portions 111 and groove portions 112), when the tooth is formed as shown in FIG. 2(b), a surface area of the portion (overlapped portion) 18 on which the folded portions 141a and 141b are overlapped increases. Accordingly, in the present embodiment, the folded portions 141a and 141b are firmly fastened (plastically fastened) to each other.

In addition, in the present embodiment, since each uneven shape is configured such that the uneven shape (groove portions 112 and projection portions 111) of the folded portion 141a and the uneven shape (groove portions 112 and projection portions 111) of the folded portion 141b, in which the folded portions 141a and 141b are overlapped to each other, are fitted to each other, it is possible to further increase a fastening force between the folded portions 141a and 141b.

Hereinbefore, in the fifth embodiment, the material 11 includes the projection portions 111 (protrusion portions) and the groove portions 112 (recessed portions) provided on the upper surface 11b of the material 11, and in the standing wall portion forming process, the folding is performed such that the protrusion portions 111 and the groove portions 112 are meshed with each other on a boundary interface (a boundary interface between the folded portion 141a and the folded portion 141b: that is, the overlapped portion 18) between the layers of the standing wall portion 14.

In the present embodiment, the case where the two-plate stacked standing wall portion 14 is formed is described. However, the present embodiment can be applied to a case where the standing wall portion in which three or more plates are stacked is formed. For example, in the formed part 11F shown in FIG. 5(c), the formed part 11G shown in FIG. 6(c), and the formed part 11H shown in FIG. 7(b), an uneven shape (projection portions 111 and groove portions 112) similar to that of the present embodiment may be formed on the surface on which the folded portions 171a and 171b are overlapped and the surface on which the folded portions 171b and 171c are overlapped.

Sixth Embodiment

Next, a sixth embodiment of the present invention will be described.

Similarly to the first embodiment, a method of manufacturing a mechanical part (toothed part) according to the sixth embodiment also includes the standing wall portion forming process (first process) and the tooth forming process (second process). The sixth embodiment is similar to the first embodiment in that the standing wall portion 14 (portion to be processed) having a two-layer structure is formed in the material 11 in the standing wall portion forming process. However, the forging process of the sixth embodiment in the tooth forming process is different from that of the first embodiment.

Figure 12:
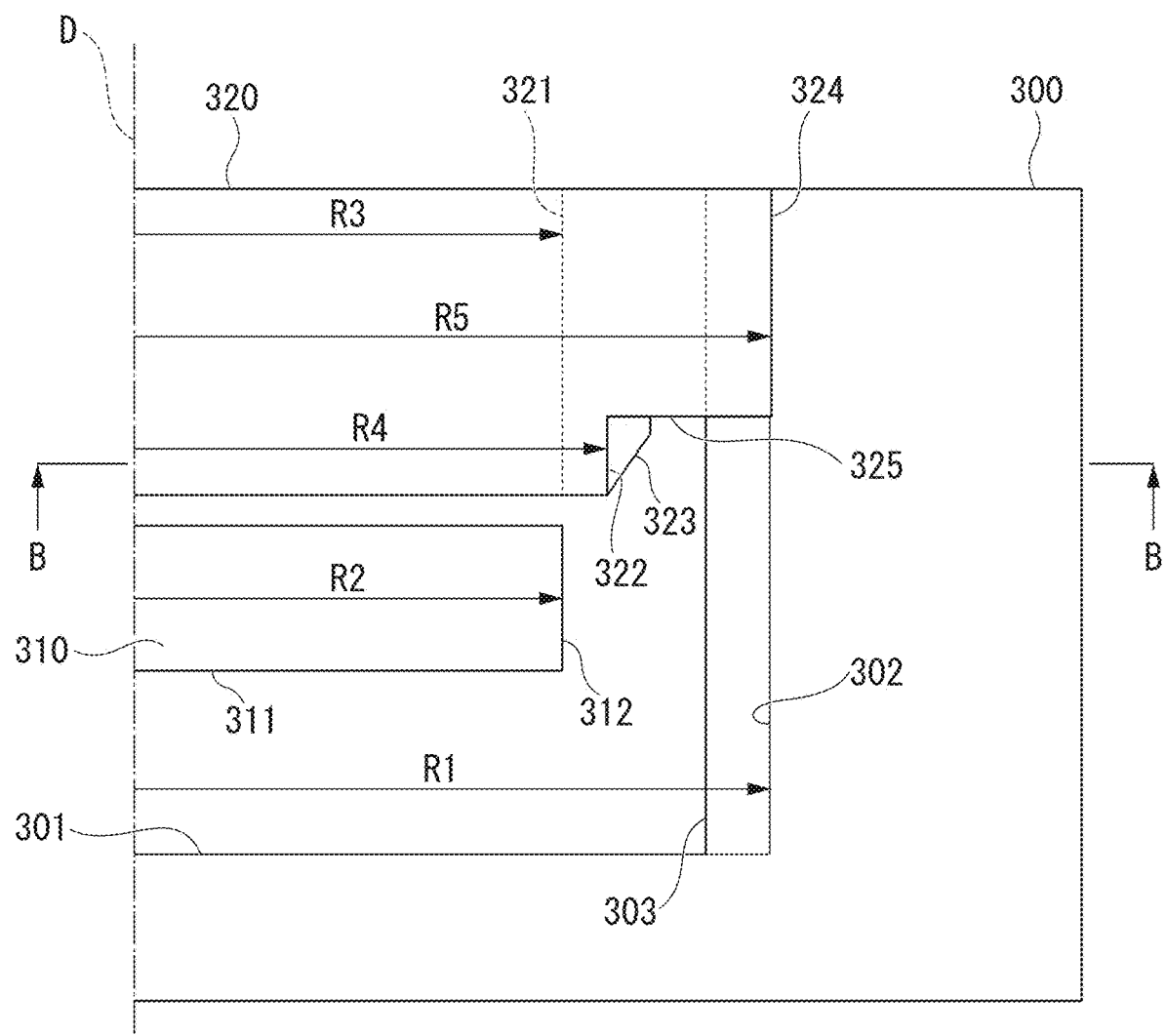
FIG. 12 is a schematic configuration view of a press machine used in a tooth forming process in a method of manufacturing a mechanical part according to a sixth embodiment.
Figure 13:
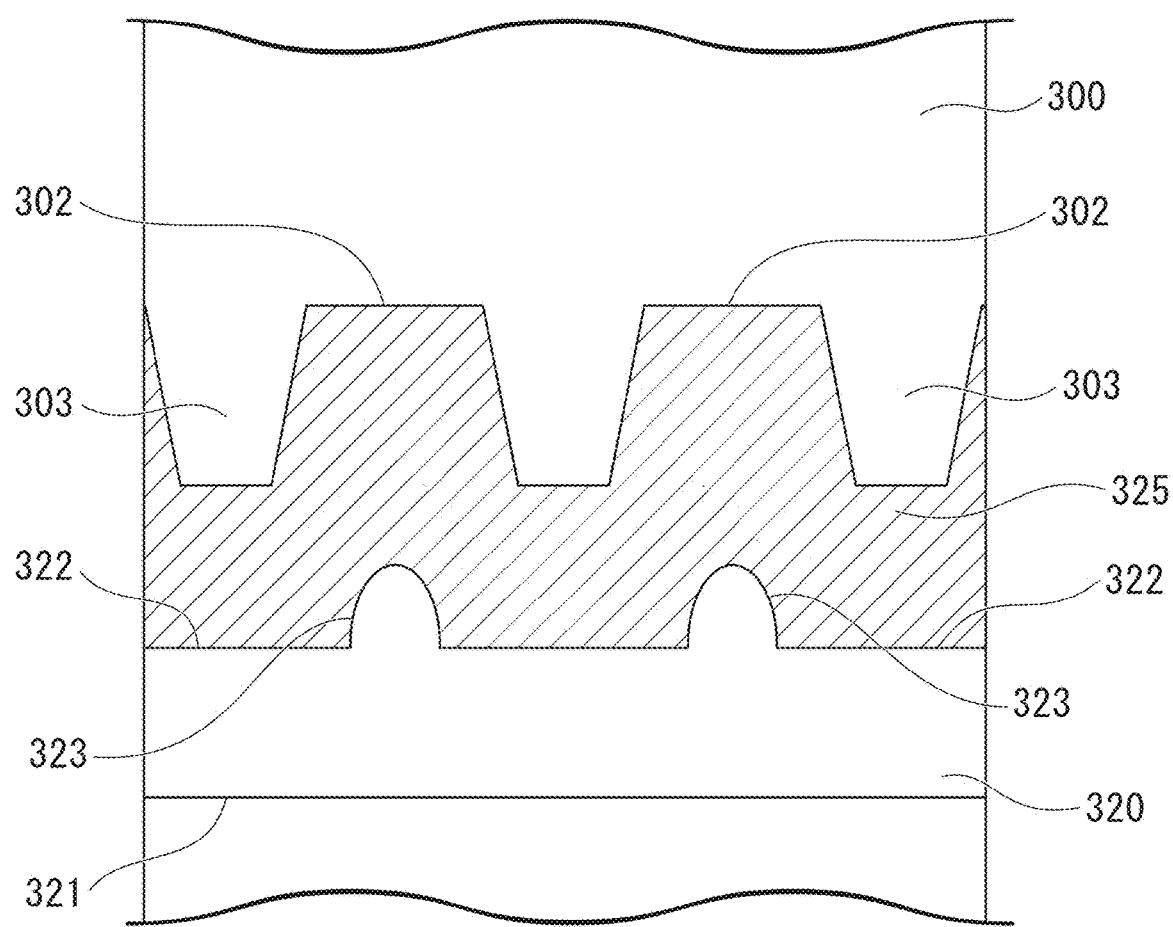
FIG. 13 is a sectional view taken along line B-B of the press machine shown in FIG. 12.

FIG. 12 is a schematic configuration view of a press machine used in a tooth forming process of the sixth embodiment. FIG. 13 is a sectional view taken along line B-B of the press machine shown in FIG. 12. As shown in FIG. 12, the press machine used in the tooth forming process of the sixth embodiment includes a die 300, a first punch 310, and a second punch 320.

The die 300 has a drive axial line D of the press machine as a center axial line, and is a cylindrical component of the die and punch having a bottom on one end. The die 300 includes a bottom portion upper surface 301 having a flat surface, an inner circumferential surface 302 (side surface) which is a curved surface having a radius R1 about the drive axial line D, and a plurality of protrusions 303 which protrude from the inner circumferential surface 302 toward the inside in the radial direction which has the drive axial line D as the center. Respective protrusions 303 are provided on the inner circumferential surface 302 to extend along the drive axial line D. In addition, respective protrusions 303 are provided on the inner circumferential surface 302 so as to be arranged at predetermined intervals in the circumferential direction about the drive axial line D. Lower ends of the respective protrusions 303 are connected to the bottom portion upper surface 301.

In this way, the inner circumferential surface 302 of the die 300 is a side surface having a shape corresponding to a target shape (that is, in the present embodiment, a tooth shape) of the standing wall portion 14. Hereinafter, the protrusion 303 provided on the inner circumferential surface 302 of the die 300 is referred to a toothed protrusion.

The first punch 310 is a columnar component of the die and punch having the drive axial line D of the press machine as the center axial line. The first punch 310 has a lower surface 311 which is a flat surface and an outer circumferential surface 312 which is a curved surface having the radius R2 about the drive axial line D. The radius R2 (that is, the outer diameter R2 of the first punch 310) of the outer circumferential surface 312 of the first punch 310 is smaller than the radius R1 (that is, the inner diameter R1 of the die 300) of the inner circumferential surface 302 of the die 300. The first punch 310 is installed so as to be movable in an internal space (upper space of the bottom portion upper surface 301) of the die 300 along the drive axial line D.

The second punch 320 is an annular component of the die and punch which has the drive axial line D of the press machine as a center axial line. The second punch 320 includes an inner circumferential surface 321 which is a curved surface having a radius R3 about the drive axial line D, a lower outer circumferential surface 322 (side surface) which is provided on the lower portion of the second punch 320 and is a curved surface having a radius R4 about the drive axial line D, a plurality of axial pressing protrusions 323 which protrude from the lower outer circumferential surface 322 toward the outside in the radial direction about the drive axial line D, a holding portion 324 which protrudes from the lower outer circumferential surface 322 toward the outside in the radial direction about the drive axial line D and is provided on the upper portion of the lower outer circumferential surface 322 so as to annularly extend in the circumferential direction about the drive axial line D, and a pressing surface 325 which is a flat bottom surface of the holding portion 324.

The radius R3 (that is, inner diameter R3 of the second punch 320) of the inner circumferential surface 321 of the second punch 320 is the same as the outer diameter R2 of the first punch 310. That is, the first punch 310 can be accommodated in the internal space of the second punch 320. The radius R4 of the lower outer circumferential surface 322 of the second punch 320 is larger than the outer diameter R2 (=R3) of the first punch 310 and is smaller than the inner diameter R1 of the die 300.

The respective axial pressing protrusions 323 are provided on the lower outer circumferential surface 322 so as to extend along the drive axial line D. In addition, the respective axial pressing protrusions 323 are provided on the lower outer circumferential surface 322 so as to be arranged at predetermined intervals in the circumferential direction about the drive axial line D. Lower ends of the respective axial pressing protrusions 323 are inclined toward the lower outer circumferential surface 322. Upper ends of the respective axial pressing protrusions 323 are connected to the pressing surface 325.

In addition, as shown in FIG. 13, each axial pressing protrusion 323 of the second punch 320 is disposed on the lower outer circumferential surface 322 so as to be positioned between the adjacent toothed protrusions 303 provided on the inner circumferential surface 302 of the die 300. In addition, the lower outer circumferential surface 322 of the second punch 320 and the inner circumferential surface 302 of the die 300 are curved surfaces in the circumferential direction about the drive axial line D. However, in FIG. 13, for convenience, the lower outer circumferential surface 322 of the second punch 320 and the inner circumferential surface 302 of the die 300 are shown as flat surfaces.

As shown in FIG. 13, the flat surface shape of the holding portion 324 of the second punch 320, that is, the shape (a hatched portion in FIG. 13) of the pressing surface 325 is set such that a space between the second punch 320 and the die 300 is closed without a gap. Accordingly, as shown in FIG. 12, when the maximum length from the drive axial line D to the end surface of the holding portion 324 in the radial direction about the drive axial line D is defined as R5, the maximum length R5 is the same as the inner diameter R1 of the die 300.

The second punch 320 having the above-described configuration is installed so as to be movable in the internal space (the upper space of the bottom portion upper surface 301) of the die 300 along the drive axial line D. As shown in FIG. 12, the initial position of the second punch 320 on the drive axial line D is set to be above the first punch 310.

Figure 14:
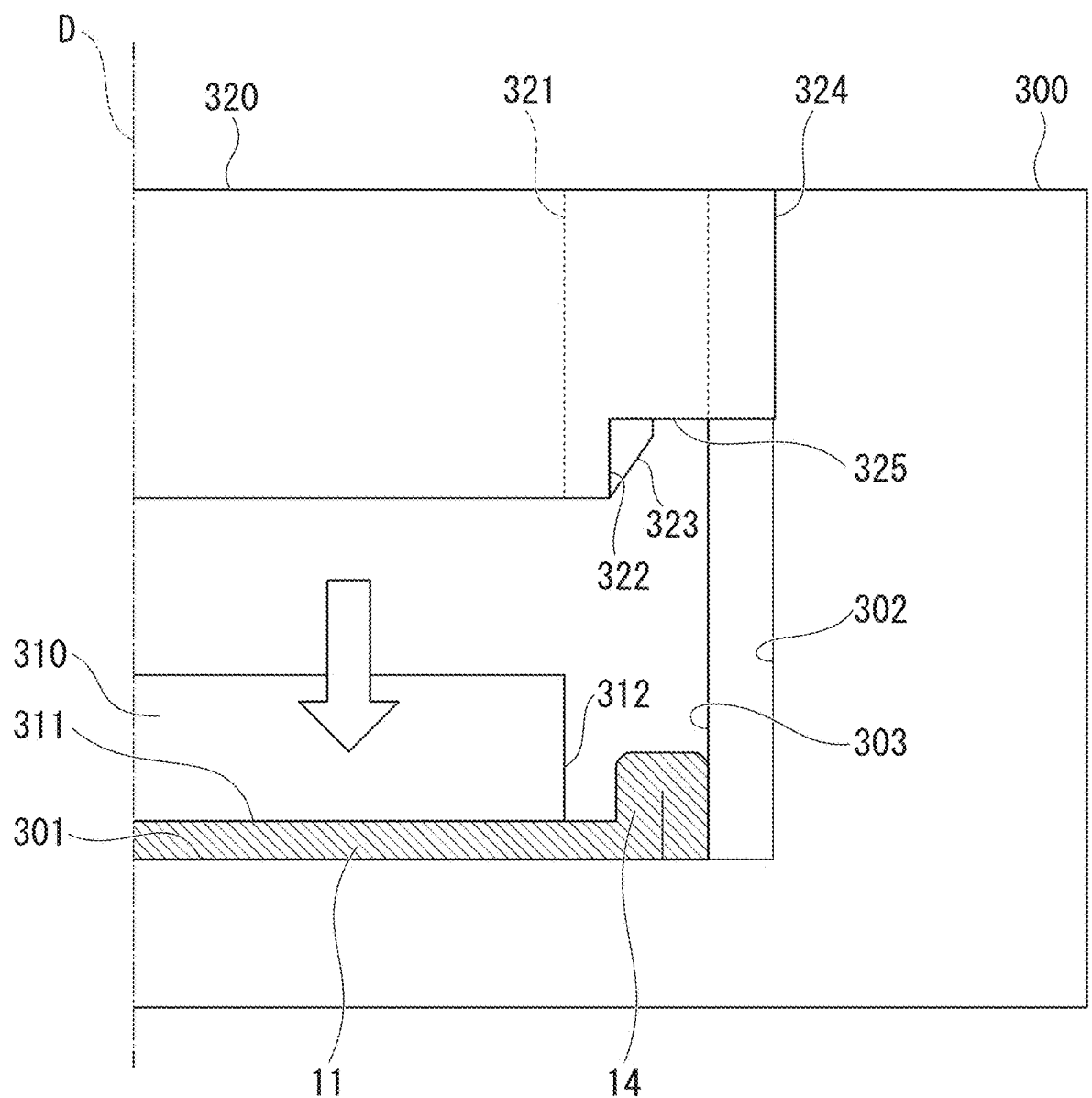
FIG. 14 is an explanatory view of the tooth forming process in the method of manufacturing a mechanical part according to the sixth embodiment.
Figure 15:
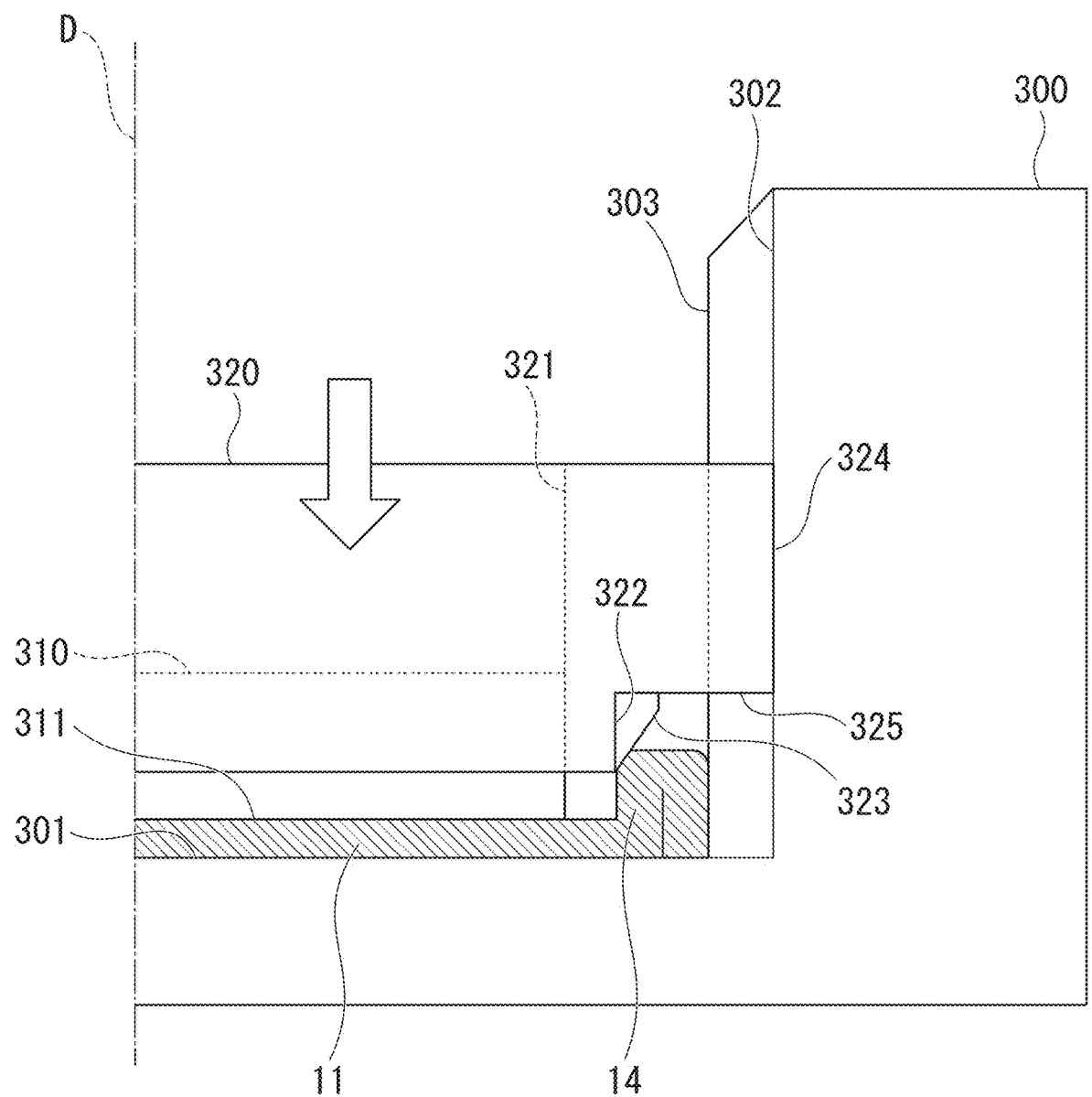
FIG. 15 is an explanatory view of the tooth forming process in the method of manufacturing a mechanical part according to the sixth embodiment.

FIGS. 14 and 15 are explanatory views of the tooth forming process in the method of manufacturing a mechanical part according to the sixth embodiment. Since the standing wall portion forming process of the sixth embodiment is similar to that of the first embodiment, descriptions thereof are omitted. However, as described in FIG. 14, it is assumed that the material 11 having the standing wall portion 14 of a two-layer structure is obtained by the standing wall portion forming process of the sixth embodiment. In addition, hereinafter, in both end portions of the standing wall portion 14 in the plate thickness direction (the radial direction of the material 11) of the layer, the end portion farthest from the center (center axis 1) of the material 11 is defined as an outer end portion, and the other end portion is defined as an inner end portion.

As shown in FIG. 14, the tooth forming process of the sixth embodiment, first, the material 11 in which the standing wall portion 14 is formed is placed on the bottom portion upper surface 301 of the die 300 in a state where the die 300 is fixed at a predetermined position on the drive axial line D. In this case, the material 11 is placed on the die 300 such that the center axis 1 of the material 11 coincides with the drive axial line D of the press machine.

Continuously, the first punch 310 moves (is lowered) toward the bottom portion upper surface 301 of the die 300 along the drive axial line D (that is, the plate thickness direction of the material 11) until the lower surface 311 of the first punch 310 comes into contact with the material 11. In addition, the part (that is, the part corresponding to the drive plate) of the material 11 except for the standing wall portion 14 is interposed between the lower surface 311 of the first punch 310 and the bottom portion upper surface 301 of the die 300 in a state where the toothed protrusion 303 provided on the inner circumferential surface 302 of the die 300 comes into contact with the outer end portion of the standing wall portion 14.

In this way, in the state where the material 11 is interposed between the first punch 310 and the die 300, a gap having a length equivalent to a difference between the outer diameter R2 of the first punch 310 and the radius R4 of the lower outer circumferential surface 322 of the second punch 320 is formed between the outer circumferential surface 312 of the first punch 310 and the inner end portion of the standing wall portion 14.

Continuously, as shown in FIG. 15, the second punch 320 is lowered toward the bottom portion upper surface 301 of the die 300 along the drive axial line D until the lower end of the second punch 320 comes into contact with the material 11, the axial pressing protrusion 323 of the second punch 320 is pushed into the inner end portion of the standing wall portion 14, the shape of the standing wall portion 14 is changed to the tooth shape (target shape) defined by the toothed protrusion 303 while crushing the standing wall portion 14 by the pressing surface 325 of the second punch 320 so as to fasten (press-weld) the layers of the standing wall portion 14 by plastic deformation.

During the lowering of the second punch 320, the wall between the lower outer circumferential surface 322 and the inner circumferential surface 321 of the second punch 320 is inserted into the gap between the outer circumferential surface 312 of the first punch 310 and the inner end portion of the standing wall portion 14 while the first punch 310 is accommodated in the internal space of the second punch 320. Accordingly, the second punch 320 can be smoothly lowered until the lower end of the second punch 320 comes into contact with the material 11.

In addition, as can be understood from FIG. 15, the thickening amount of the standing wall portion 14 is dependent on the length between the lower end of the second punch 320 and the pressing surface 325, that is, the length of the lower outer circumferential surface 322 of the second punch 320 in the direction of the drive axial line D. Accordingly, the length of the lower outer circumferential surface 322 of the second punch 320 in the direction of the drive axial line D may be appropriately set according to the target value of the thickening amount.

Figure 16:
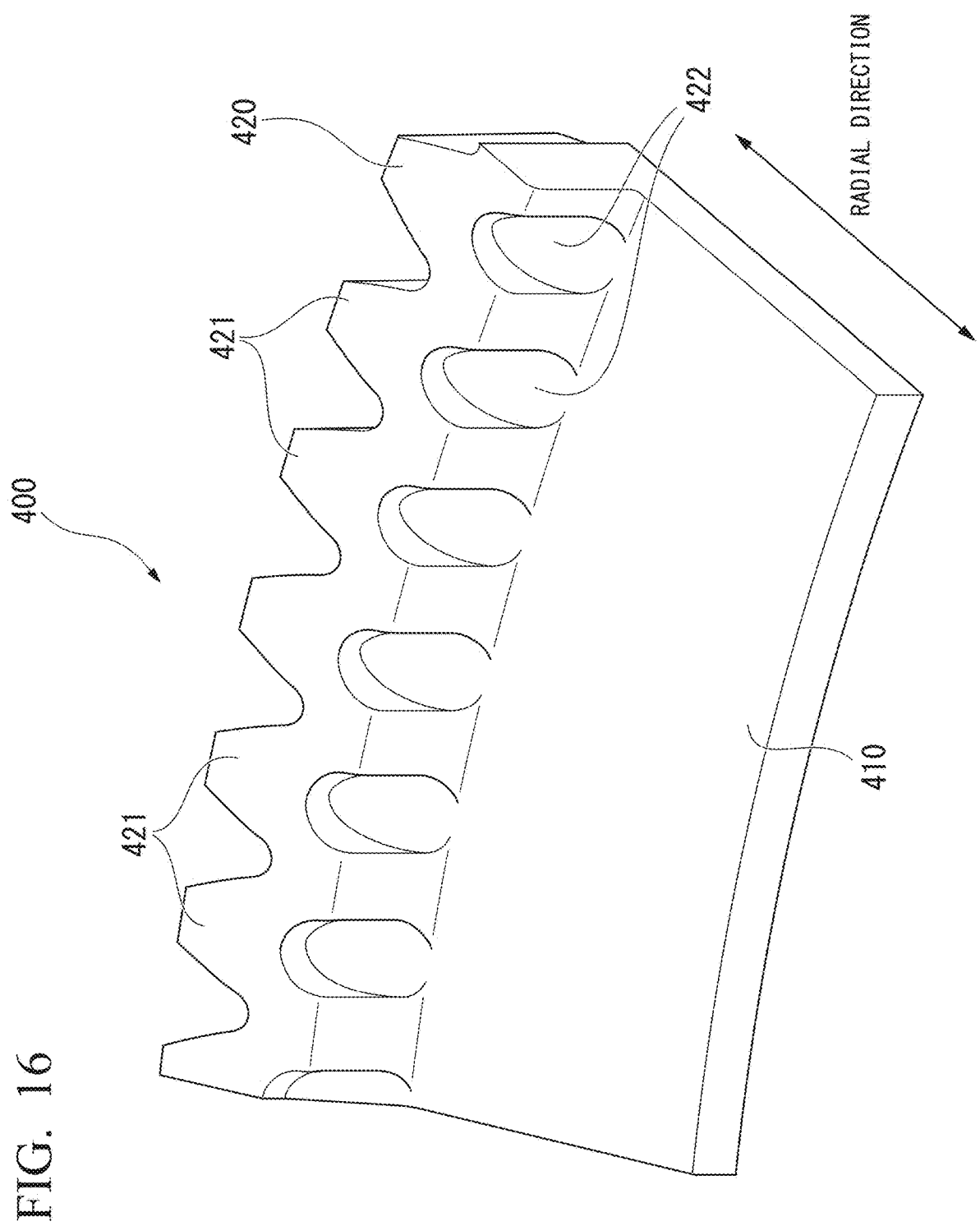
FIG. 16 is a view schematically showing a portion of a toothed part which is manufactured by the method of manufacturing a mechanical part according to the sixth embodiment.

After the above-described tooth forming process ends, a toothed part 400 shown in FIG. 16 is obtained. That is, the toothed part 400 includes a first flat portion 410 (a part corresponding to the drive plate), and a second portion 420 (a part corresponding to the ring gear) which is provided on the end portion of the first portion 410 and protrudes in the plate thickness direction of the first portion 410 from the surface of the first portion 410.

In both end portions of the second portion 420 in the radial direction of the toothed part 400, when the end portion farthest from the center of the toothed part 400 is defined as an outer end portion and the other end portion is defined as an inner end portion, toothed portions 421 having the tooth shape defined by the toothed protrusions 303 of the die 300 are formed on the outer end portion of the second portion 420 in the circumferential direction of the toothed part 400. In addition, in the inner end portion of the second portion 420, depressions 422 generated by pushing the axial pressing protrusions 323 of the second punch 320 into the standing wall portion 14 of the material 11 are formed in the circumferential direction of the toothed part 400.

Figure 17:
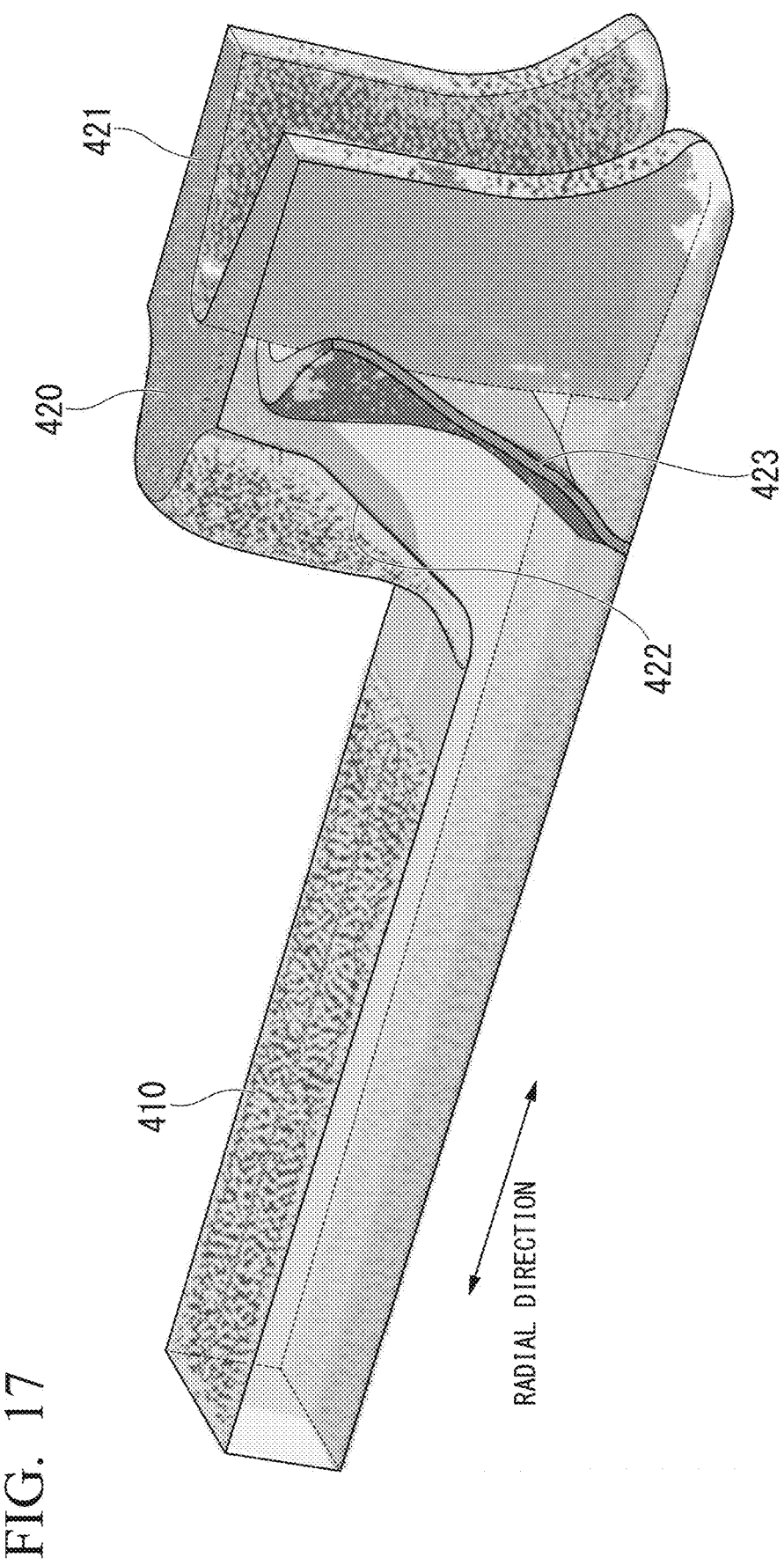
FIG. 17 is a view schematically showing an interlayer boundary plane which exists inside a second portion (a part corresponding to a ring gear) formed by the tooth forming process of the sixth embodiment.

As shown in FIG. 17, in the second portion 420 which is formed by the tooth forming process of the sixth embodiment, an interlayer boundary surface 423 existing inside the second portion 420 has a three-dimensionally complicated curved shape. Therefore, according to the method of manufacturing a mechanical part of the sixth embodiment, it is possible to increase an interlayer bonding force inside the second portion 420, and as a result, it is possible to increase the strength of the second portion 420 (that is, the part corresponding to the ring gear) of the toothed part 400.

In addition, the tooth forming process of the sixth embodiment may be adopted as the tooth forming processes of the first to fifth embodiments.

In addition, in a case where the thickness of the standing wall portion 14 after the standing wall portion forming process (first process) is larger than the thickness of the tooth bottom portion (a part between the toothed portions 421 adjacent to each other in the second portion 420 of the toothed part 400), an ironing forming process corresponding to the tooth bottom portion may be added as a preliminary tooth forming process before the above-described tooth forming process (second process).

Hereinbefore, various embodiments of the present invention are described. However, the present invention is not limited to the embodiments, and modifications or the like can be applied to the present invention within the scope of the present invention. In the above-described embodiments, the die 23 and the plate holder 24 are fixed and the punches 21, 22, 25, 26, and 27 move downward with respect to the die 23. However, any configuration may be adopted as long as the punches 21, 22, 25, 26, and 27 move relative to the die 23.

In the above-described embodiments, the case where the material 11 is the circular metal plate (for example, the steel plate having a circular shape) is exemplified. However, the present invention is not limited to this, and as the material 11, known various materials in which deformation processing is possible, such as metal of iron, steel, aluminum, titanium, stainless steel, or copper, or alloys thereof can be used. In addition, a composite material of a metal and a resin, a composite material of dissimilar metals, or the like may be adopted as the material 11.

In addition, the method of manufacturing a mechanical part according to the present invention is not limited to the toothed part which is a component of a vehicular automatic transmission, and the present invention can be applied to manufacturing of a toothed part which is a component of a driving force transmission mechanism of a general machine or a ship.

In addition, the shape of the material 11 is not limited to the circular shape. For example, the method of manufacturing a mechanical part according to the present invention can be applied to a method of manufacturing a mechanical part which includes portions each having significantly different target thickness, from a plate-shaped long material. In other words, the mechanical part which can be manufactured by the method of manufacturing a mechanical part according to the present invention is not limited to the toothed part.

BRIEF DESCRIPTION OF THE REFERENCE SYMBOLS

1: center axis
11: workpiece
11A to 11I: formed part
11a: point
11b: upper surface
11c: region
11d: region
111: projection portion
112: groove portion
12: standing wall portion
12a: reference point
13: two-plate stacked outer circumferential portion
13a: end
13b: end
14: two-plate stacked standing wall portion
14a: end
141a, 141b: folded portion
142, 143: toothed portion
15: cup bottom portion
16: three-plate stacked outer circumferential portion
16a: end
16b: end
16c: end
17: three-plate stacked standing wall portion
171a to 171c: folded portion
19: pre-bent portion
191, 192: folded portion
193: bent outer surface
21: inner diameter tooth punch
211: toothed portion
212: gap
22: outer diameter tooth punch
221: toothed portion
222: main body
223: holding portion
224: pressing surface
23: die
24: plate holder
241: outer circumferential surface 25: bend portion pushing punch
26: drawing punch
261: punch shoulder R portion
27: thickening punch
271: pushing portion
272: thickening punch pushing surface
273: inner circumferential surface
300: die
310: first punch
320: second punch
400: toothed part
410: first portion
420: second portion

The invention claimed is:

1. A method of manufacturing a mechanical part, comprising:
   a first process of forming, by performing a folding process to an end portion of a material having a circular shape with a plate thickness, a portion to be processed having a structure, in which a plurality of layers of the material of the end portion overlap each other in a direction where the plate thickness direction of the layers of the material of the end portion is orthogonal to a center axis of the material; and
   a second process of changing, by performing a forging process to the portion to be processed, a shape of the portion to be processed to a target shape in which the plurality of the layers of the material are press-welded to each other by plastic deformation,
   wherein the first process of forming includes:
      a first standing wall portion forming process of forming a first standing wall by folding the end portion of the material in a folding direction toward the center axis so that the plate thickness direction of the first standing wall portion is orthogonal to the center axis,
      an overlapping portion forming process of forming an overlapping portion where the layers of the material of the end portion overlap by folding the first standing wall portion by 90 degrees in the folding direction, and
      a second standing wall portion forming process of forming a second standing wall by folding the overlapping portion at an inner end of the overlapping portion or at a position closer to the center axis of the material, thereby forming the portion to be processed.

2. The method of manufacturing a mechanical part according to claim 1,
   wherein in the first process, the portion to be processed having a structure in which two layers or three layers overlap each other is formed in the material.

3. The method of manufacturing a mechanical part according to claim 1,
   wherein the first process includes thickening the portion to be processed in the plate thickness direction of the plurality of layers by adding a pressing force to the portion to be processed in the plate thickness direction of the material.

4. The method of manufacturing a mechanical part according to claim 3,
   wherein when a length of the portion to be processed in the plate thickness direction of the plurality of layers is defined as a thickness of the portion to be processed, a thickness of the portion to be processed before the thickening is defined as TO, and a thickness of the portion to be processed after the thickening ends is defined as Tcl, in the thickening, a thickening amount of the portion to be processed is controlled such that a thickening ratio Tra which is obtained by dividing the thickness Tcl by the thickness TO satisfies the following Conditional Expression (1), $$1.0 < Tra \leq 1.5 \tag{1}.$$

5. The method of manufacturing a mechanical part according to claim 1,
   wherein the material includes a protrusion portion and a recessed portion provided on a surface of the material, and
   wherein in the first process, the folding is performed such that the protrusion portion and the recessed portion mesh with each other at a boundary interface between the plurality of layers of the portion to be processed.

6. The method of manufacturing a mechanical part according to claim 1,
   wherein when in both end portions of the portion to be processed in the plate thickness direction of the plurality of layers, an end portion farthest from the center axis of the material is defined as an outer end portion and the other end portion is defined as an inner end portion,
   the second process includes
   placing the material in which the portion to be processed is formed on a die,
   interposing a part of the material except for the portion to be processed between a lower surface of a first punch and the die in a state where a side surface of the die comes into contact with the outer end portion of the portion to be processed, and
   moving a second punch having a side surface on which an axial pressing protrusion is provided toward the die in the plate thickness direction of the material, pushing the axial pressing protrusion into the inner end portion of the portion to be processed, and changing the shape of the portion to be processed to the target shape while crushing the portion to be processed and press-welding the layers of the portion to be processed by the plastic deformation.

* * * * *